United States Patent [19]

Larson et al.

[11] Patent Number: 4,611,322

[45] Date of Patent: Sep. 9, 1986

[54] TRAFFIC LOAD CONTROL ARRANGEMENT AND METHOD FOR A PACKET SWITCHING SYSTEM

[75] Inventors: Mikiel L. Larson, St. Charles; Wing N. Toy, Glen Ellyn, both of Ill.

[73] Assignee: AT&T Bell Laboratories, Murray Hill, N.J.

[21] Appl. No.: 637,711

[22] Filed: Aug. 3, 1984

[51] Int. Cl.$^4$ .............................................. H04J 3/26
[52] U.S. Cl. ..................................................... 370/60
[58] Field of Search ............................. 370/60, 94, 92

[56] References Cited

U.S. PATENT DOCUMENTS

| | | | |
|---|---|---|---|
| 2,857,472 | 10/1958 | Judy .................................. | 179/27 |
| 3,142,728 | 7/1964 | MacLeod ............................. | 179/27 |
| 4,099,235 | 7/1978 | Hoschler et al. ................... | 364/200 |
| 4,287,592 | 9/1981 | Paulish et al. ...................... | 370/88 |
| 4,403,286 | 9/1983 | Fry et al. ............................ | 364/200 |
| 4,484,326 | 11/1984 | Turner ................................ | 370/94 |
| 4,507,782 | 3/1985 | Kunimasa et al. .................. | 370/60 |

OTHER PUBLICATIONS

J. Rinde, "TYMNET I: An Alternative to Packet Technology", *Proc. 3d Int'l Conf. on Computer Comm.*, (Toronto, Aug. 3-6, 1976), pp. 268-273.

J. L. Grange et al., "Congestion Control for a Packet-Switched Network", *Computer Communications*, vol. 3, No. 3, Jun. 1980, pp. 106-116.

M. Schwartz et al., "Routing Techniques Used in Computer Communication Networks", *IEEE Transactions on Communications*, vol. Com-28, No. 4, Apr. 1980, pp. 539-552.

J. H. DeJean et al., "Packet Switching Multiservice Network", *Proc. Int'l Switching Symposium*, (Montreal, Sep. 21-25, 1981), Session 32C, Paper 1, pp. 1-7.

R. Rettbarg et al., "Development of a Voice Funnel System: Design Report", Bolt Beranek and Newman, Inc., Report No. 4098, (Aug. 1979), pp. II-44 to 47.

N. Sone et al., "Extended DDX Packet Switched Network", *Japan Telecommunications Review*, Apr. 1981, pp. 167-174.

E. Szurkowski, "The Use of Multi-Stage Switching Networks in the Design of Local Network Packet Switches", *IEEE Int'l Conf. on Comms.*, vol. 2, (1981), pp. 25.2.1-25.2.5.

J. F. Boyle et al., "Transmission/Switching Interfaces and Toll Terminal Equipment", *The Bell System Technical Journal*, vol. 56, No. 7, Sep. 1977, pp. 1057-1097.

*Primary Examiner*—Douglas W. Olms
*Attorney, Agent, or Firm*—David Volejnicek

[57] ABSTRACT

A traffic load control arrangement for a packet switching system (FIGS. 1A and 1B) uses a circuit (1521) in each trunk controller (131) to determine the call traffic load of the trunk controller. To set up a call path, the central processor (115) of a switch (102) selects a trunk (118) to serve the call and sends a logical channel setup packet (500e) indicating either forced or normal selection to the selected trunk's controller (131). If normal selection is indicated, the selected trunk controller refuses to serve the call and returns a channel setup no-acknowledgement packet (500f) to the central processor if the trunk controller's load exceeds a predetermined level. Otherwise, the trunk controller sets up a channel to serve the call and returns a channel setup acknowledgment packet (500g) to the central processor. In response to the no-acknowledgment packet, the central processor attempts to find another trunk to serve the call. In the case of a toll office (104), if no other trunk can be found and a call setup acknowledgment packet (500n) has not yet been returned by the toll office switch to the preceding switch, the toll office switch returns a call setup no-acknowledgment packet (500o) to the preceding switch. The preceding switch responds to receipt of the no-acknowledgment packet by attempting to find a trunk leading to another switch to serve the call.

47 Claims, 37 Drawing Figures

ACTIONS UNDERTAKEN BY TRUNK CONTROLLER

FIG. 5 MEMORY MAP

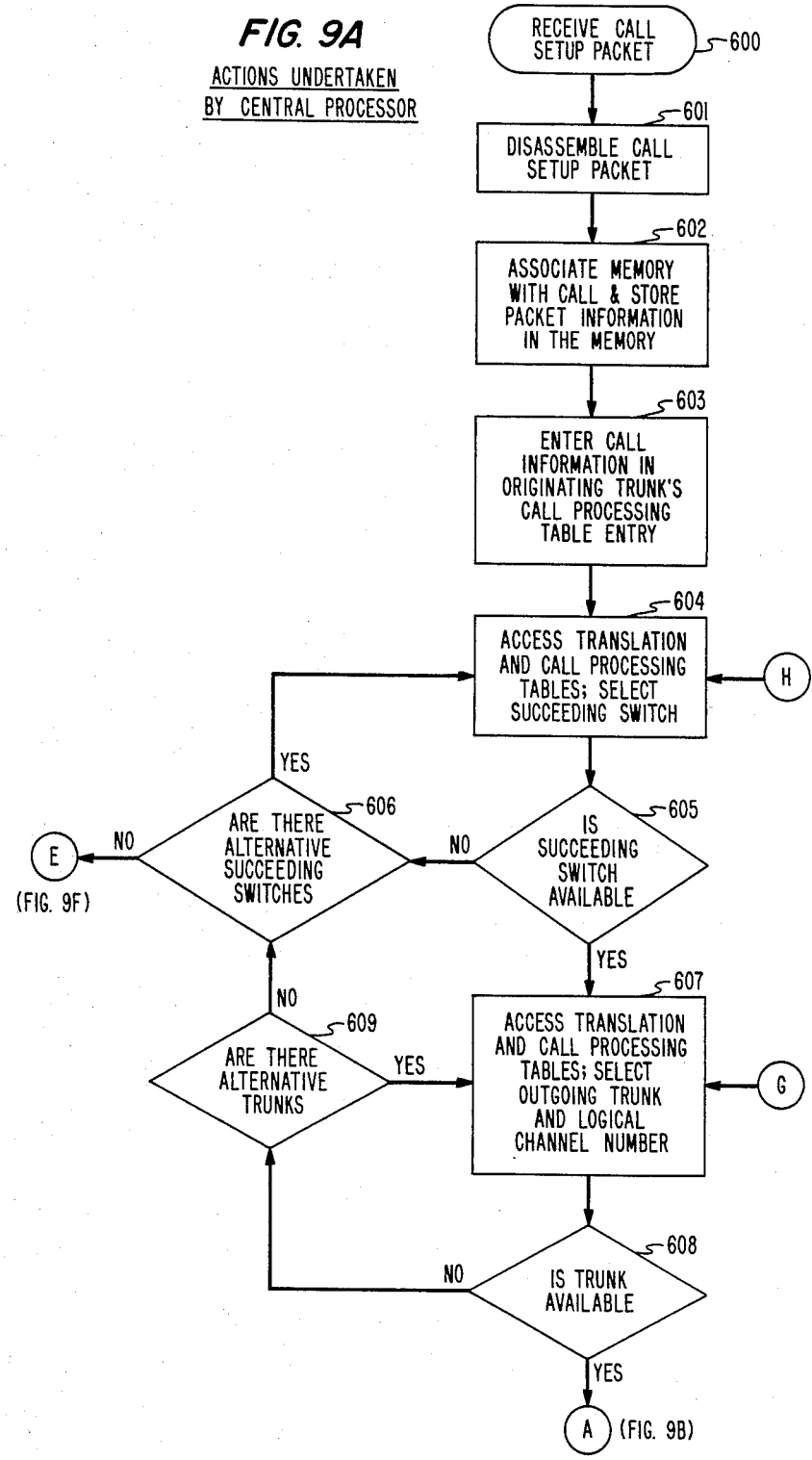

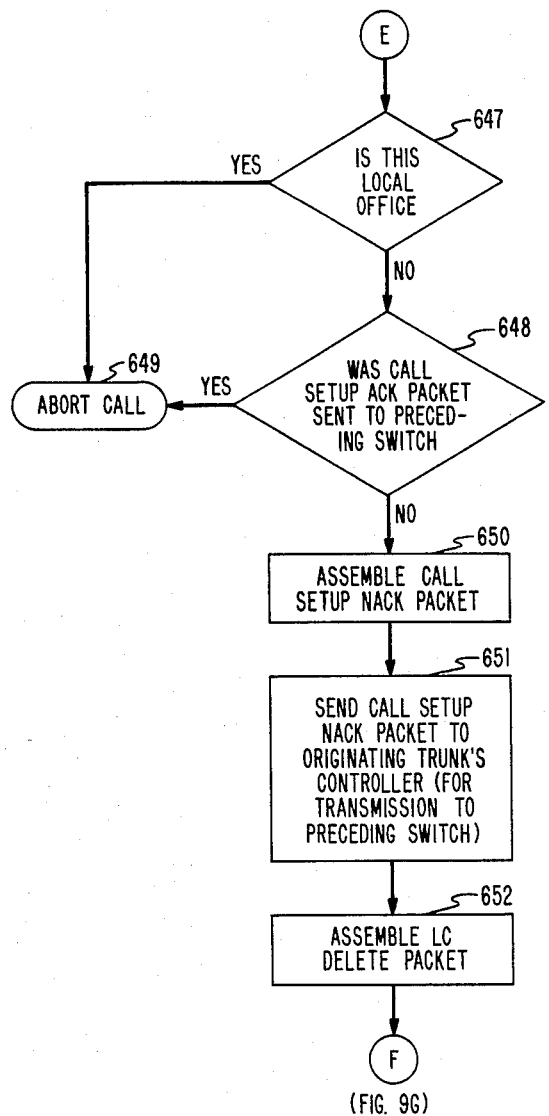

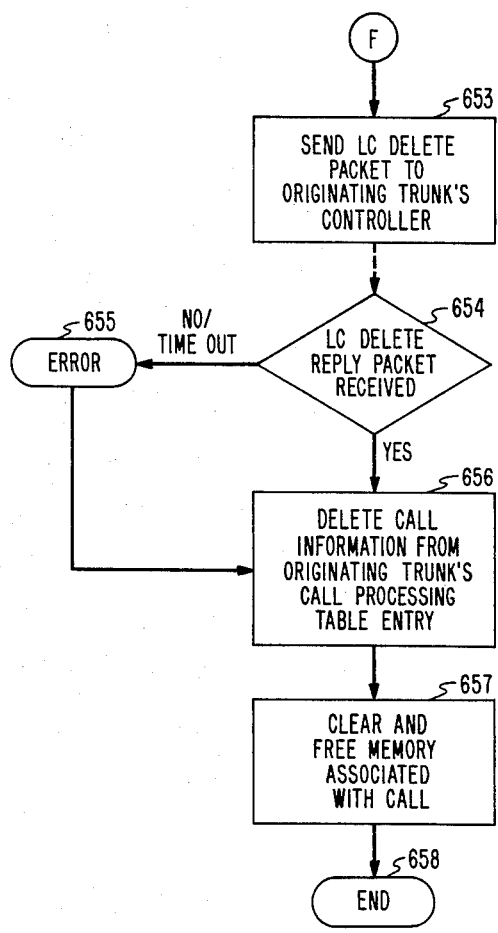

TRAFFIC LOAD CONTROL ARRANGEMENT AND METHOD FOR A PACKET SWITCHING SYSTEM

TECHNICAL FIELD

This invention relates to packet switching systems and to packet switch arrangements and methods for controlling communication traffic loads served by communication path equipment in such systems.

BACKGROUND OF THE INVENTION

A packet switching system, such as may be used in telephony, is generally made up of a plurality of packet switches interconnected by communication links such as telephone trunks. A packet switch commonly comprises a packet switching network for selectively connecting various of its inputs to various of its outputs; trunk controllers each for interfacing a communication link to an input and an output of the packet switching network; and a central processor for controlling the operation of the switch. Such packet switches and systems are known in the art. An example thereof is disclosed in the copending U.S. patent application of Jonathan S. Turner, entitled "An Interface Facility for a Packet Switching System", U.S. patent application Ser. No. 392,228, filed on June 25, 1982, issued on Dec. 11, 1984, as U.S. Pat. No. 4,488,289, and assigned to the same assignee as this application.

The call path setup procedure in such a system commonly requires that the central processor at each switch respond to the receipt over an incoming trunk of a call setup packet by assigning an outgoing trunk to the call and transmitting the call setup packet on the outgoing trunk to the next switch or other equipment. This process is repeated at each switch until a complete path interconnecting the calling party with the called party is set up for the call. Assigned trunks are not generally dedicated to a single call at a time. Rather, they are commonly shared by a plurality of simultaneous calls. Hence the trunks, and their associated trunk controllers, are treated by the central processor as physical resources to be shared by the interconnection paths of a plurality of calls. Each central processor keeps track of the status of the switch's trunk controllers and assigns the trunk controllers and their associated trunks as links in various interconnection paths.

The central processor assigns trunk controllers to interconnection paths in a manner that seeks to distribute call traffic evenly between alternative trunk controllers, to maximize information flow through the switch. This is a difficult task, however, because conventionally the central processor has no knowledge of the amount of information that is or will be transmitted by a call over a path, and hence has no knowledge of the call traffic being served by a trunk controller.

An approach taken in the past has been for the central processor to assign alternative trunk controllers to call paths in a round-robin fashion, to more or less equalize the number of calls that each trunk controller is assigned to serve. This policy of trunk controller assignment would be satisfactory if the traffic of each call were approximately the same. However, the traffic of different calls commonly varies considerably. As a result, this approach often does not balance the traffic load of the various trunk controllers. Consequently, undesired delay of packets, and possibly even loss of packets or of entire calls, may occur in trunk controllers that are heavily loaded or overloaded with traffic. At the same time, no appreciable delay may occur for call packets served by other trunk controllers, and these other trunk controllers may even be idle for periods of time even though the underloaded controllers are serving a number of calls that is the same as or greater than the number of calls being served by the overloaded controllers. Resultingly, the prior art, in such situations, has not been equipped to distribute calls among alternative trunk controllers in a manner that would equalize the traffic load served by a controller and that would prevent such trunk controllers from becoming overloaded.

SUMMARY OF THE INVENTION

It is these and other disadvantages of the prior art that the present invention is directed to overcoming. According to the invention, in a packet switch that includes a plurality of controllers each for interfacing an associated communication link to the switch, a method of, and apparatus for, communication traffic load control are provided such that the communication traffic load of a controller selected, for example by a central processor of the switch, to serve a communication, such as a telephone call, is determined by load-determining apparatus that is preferably included with the controller, and serving of the communication is refused by apparatus of the selected controller when the controller is notified of its selection and its load exceeds a predetermined level. The load determination is made, for example, by measuring the level of occupancy of a communication buffer of the controller and comparing the measured occupancy level with a predetermined level. Generally in response to the rejection, either another controller is selected, for example by the switch's central processor, to serve the communication, or the communication is aborted. Alternatively in response to the rejection, the preceding packet switch in the communication's path is notified that the notifying switch cannot serve the communication The notified preceding packet switch then preferably either aborts the communication, or selects for serving the communication a controller whose associated link leads to a different packet switch than the notifying packet switch.

This approach to communication traffic load control provides effective control—one which is based on the actual traffic load being served by controllers selected to serve calls. Basing distribution among alternative controllers, or even alternative switches, of responsibility for serving communications on the traffic load of the controllers allows their loads to be substantially equalized and thereby prevents controllers from becoming overloaded.

Each controller preferably has its own apparatus for determining the communication traffic load of the controller. The load-determining apparatus provides the associated controller with information on the load being served by that controller. Based on that information, apparatus of the controller then refuses to have a communication served by the controller when the controller's load exceeds a predetermined level. Also based on that information, apparatus of the controller accepts to have a communication served by the controller when the controller's load subceeds, i.e., is below, the predetermined level. In this manner, traffic load control within a packet switch is distributed over the controllers, in that each controller effectively manages its own load. And since a controller is the best source of information regarding the load it is serving, this arrangement is highly effective in determining the controller's actual load and in preventing overload conditions from occurring in the controller. Also, the load determination is made immediately, for any one or more controllers, and determinations are made simultaneously at a plurality of controllers; there is no backlog and associated delay due to a controller waiting for another controller both to finish using and to free up the load-determining apparatus, as would be the case if a plurality of controllers were to share a single load-determining apparatus that only one of the controllers could use at any one time. Hence the determination of the load of a controller is made immediately upon notification of the controller of its selection to serve the call.

In the illustrative embodiment, the selected controller is notified of its selection via either a first or a second signal. Advantageously, the load-determining apparatus is consulted in response to only the second signal. In contrast, serving of the communication is always accepted by the selected controller in response to the first signal. Thus both the conventional approach of forcing a controller to serve a communication irrespective of the actual traffic load that it is serving, and the novel approach of allowing a controller to decide based on its actual traffic load whether or not it will serve a communication, are selectively followed by a single switch. Another attribute of the illustrative embodiment as just described is that the ability to send the first signal to a controller following sending to that controller of the second signal provides a mechanism for overriding refusal by a selected controller to serve a communication.

Further in the illustrative embodiment, refusal by a selected controller to serve a communication leads a switch's central processor to de-select the selected controller and to select another controller to serve the communication, when another controller is available. The illustrative switch and the method of communication path selection followed by it therefore do not result in a greater-than-conventional likelihood that a communication will not be served, or in fewer communications being served. Rather, the illustrative method and apparatus result in the communication load being more evenly distributed over alternative controllers, such that more communications may be served by those controllers and such that a given communication is more likely to be served effectively, without interruptions and without loss of portions thereof. Furthermore, as was described above, a refusal by a selected controller to serve a call will selectively result in a controller being forced to serve the call, thereby assuring that even under worst conditions of traffic overload a path may be formed for the communication.

Alternatively in response to the refusal by the selected controller to serve the communication, the associated switch refuses to serve the communication at all, and notifies the preceding switch in the communication path of this refusal. The notified preceding switch then de-selects the controller whose associated link leads to the notifying succeeding switch and selects another trunk controller, whose associated link leads to a switch other than the de-selected switch, to serve the communication. No longer does the inability of a particular switch to serve a communication necessarily mean that the communication cannot be completed through a switching system. Rather, the ability of a preceding switch to select a controller having a link leading to an alternative succeeding switch to serve the communication, in response to refusal by one selected succeeding switch to serve the communication, allows the communication to be routed through an alternative succeeding switch when the communication cannot be routed through one selected succeeding switch, thus allowing a communication to follow one of a number of alternative paths through the system. A communication thus has a better chance of being successfully completed than if it could follow only one possible path.

These and other advantages and features of the present invention will become apparent from the following description of an illustrative embodiment of the invention taken together with the drawing.

BRIEF DESCRIPTION OF THE DRAWING

FIGS. 9A through 9G are logical flow diagrams of the call path setup activities of the central processor of FIG. 3.

DETAILED DESCRIPTION

Figure 1A:
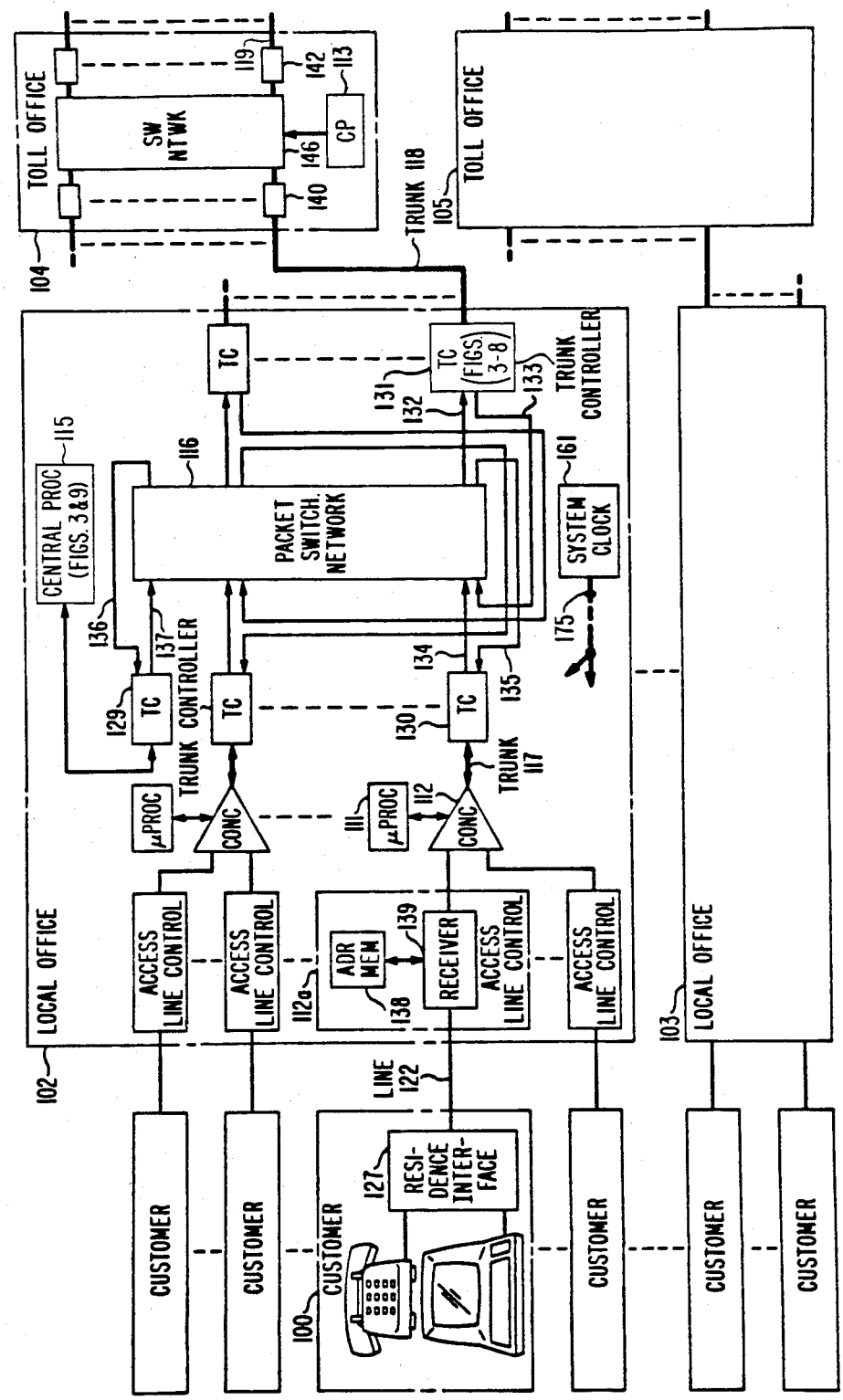
FIGS. 1A and 1B are a block diagram of an illustrative packet switching system including an embodiment of the invention.
Figure 1B:
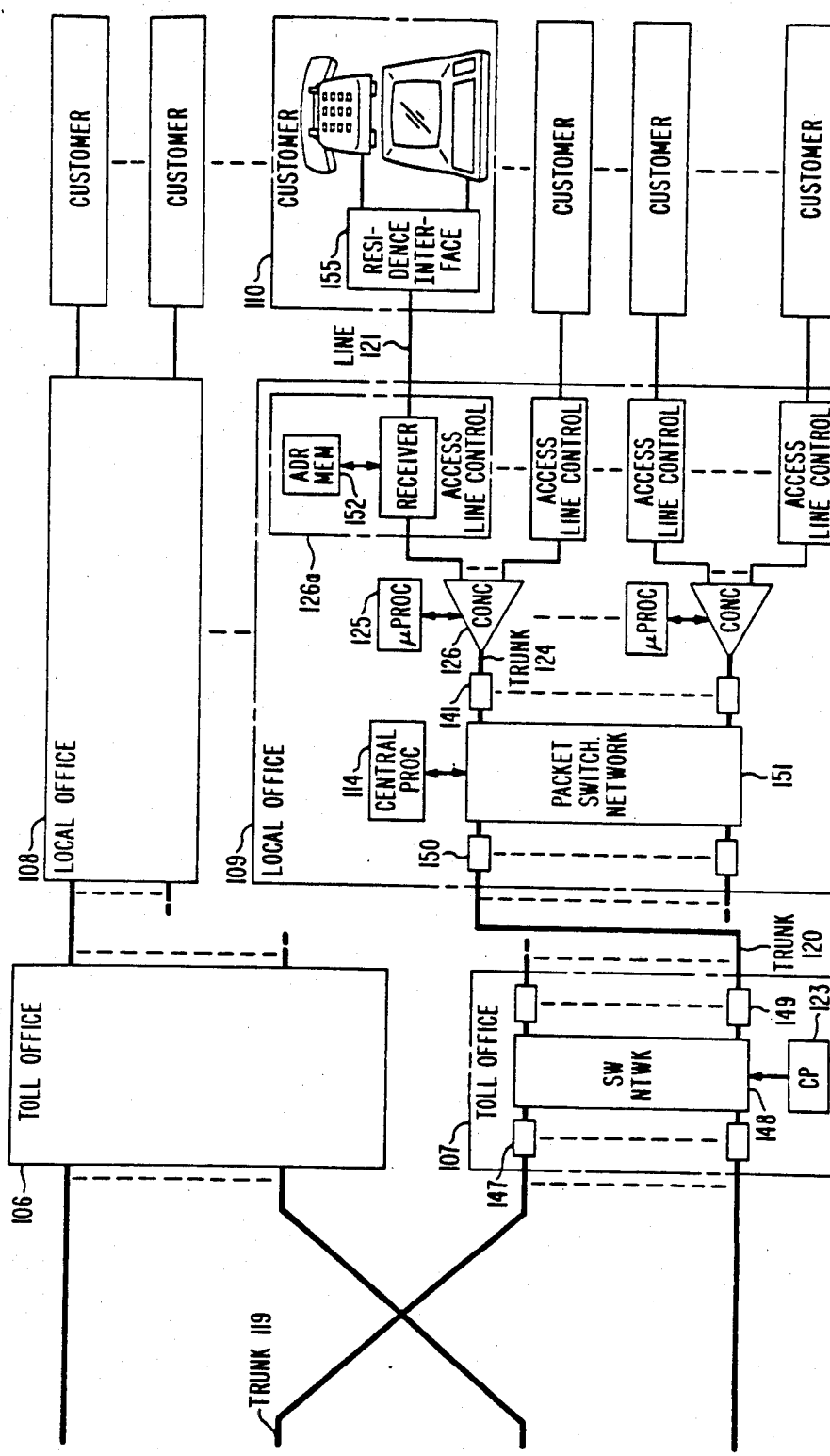
Figure 2:
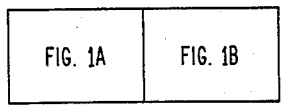
FIG. 2 is a diagram showing the arrangement of FIGS. 1A and 1B to form a complete figure.

To illustrate an embodiment of the invention, FIGS. 1A and 1B show an illustrative packet switching system having a plurality of local offices 102, 103, 108 and 109, and a plurality of toll offices 104–107, serving a plurality of customers such as customers 100 and 110. The arrangement of FIGS. 1A and 1B to form a complete figure is indicated in FIG. 2.

As shown in FIG. 1A, local office 102 comprises a packet switching network 116 which terminates a plurality of trunk controllers, and which cooperates with central processor 115 via a central processor trunk controller 129 which is also connected to the switching network. Each trunk controller is tied into the switching network by unidirectional transmission media. Trunk controller 131, for example, receives information from switching network 116 via conductor 132 and transmits information to switching network 116 via conductor 133. Switching network 116 is interconnected to toll offices such as 104 by high speed trunks, with each trunk being terminated on both ends by a trunk controller.

On the customer side of local office 102, the local office is connected to customers via concentrators which are interconnected to the switching network via trunk controllers. A concentrator has an internal switching architecture similar to that of a packet switching network. A concentrator has a self-contained trunk controller which interfaces the concentrator to the attached trunk. The concentrator's trunk controller is similar to other trunk controllers, such as the trunk controller 131 which is described in greater detail later. Each concentrator has connected to it a microprocessor which is used in conjunction with the attached access line controller to perform the initial call setup sequences and to provide call supervision as a supplement to the inherent self-routing characteristics of the packets being transmitted through the packet switching system.

The customer units are connected to the concentrators by the access line controllers. Each access line controller contains logical address and control information which is stored in the access line controller by the controlling microprocessor. This logical address information is used to control the first portion of the route taken by the packets transmitted through the attached switching network via the interconnecting trunk controller. Each access line controller is connected to a resident interface contained within each customer unit via standard bidirectional transmission media. Packets are transmitted between the access line controllers and the resident interfaces using standard packet protocols.

All connections to a switching network, such as the representative switching network 116, are made through trunk controllers, as shown in FIGS. 1A and 1B. The trunk controllers receive information at a 1.544 Mb/s rate and transmit this information into the network at an 8 Mb/s rate. Each trunk controller is capable of buffering four packets of information from the attached trunk. The buffering of packets at the input from the trunks is necessary because the packets may have to be delayed before they can be transmitted through the network. Buffering is also needed by the trunk controllers for information being received from the network before it can be retransmitted on the attached trunk. Each trunk controller is capable of buffering up to 20 packets of information from the network while retransmitting packets on the trunk. Each trunk controller has one input connection and one output connection to switching network 116. For example, trunk controller 130 transmits information to switching network 116 via conductor 134 and receives data from switching network 116 via conductor 135, as shown in FIG. 1A.

Figure 3:
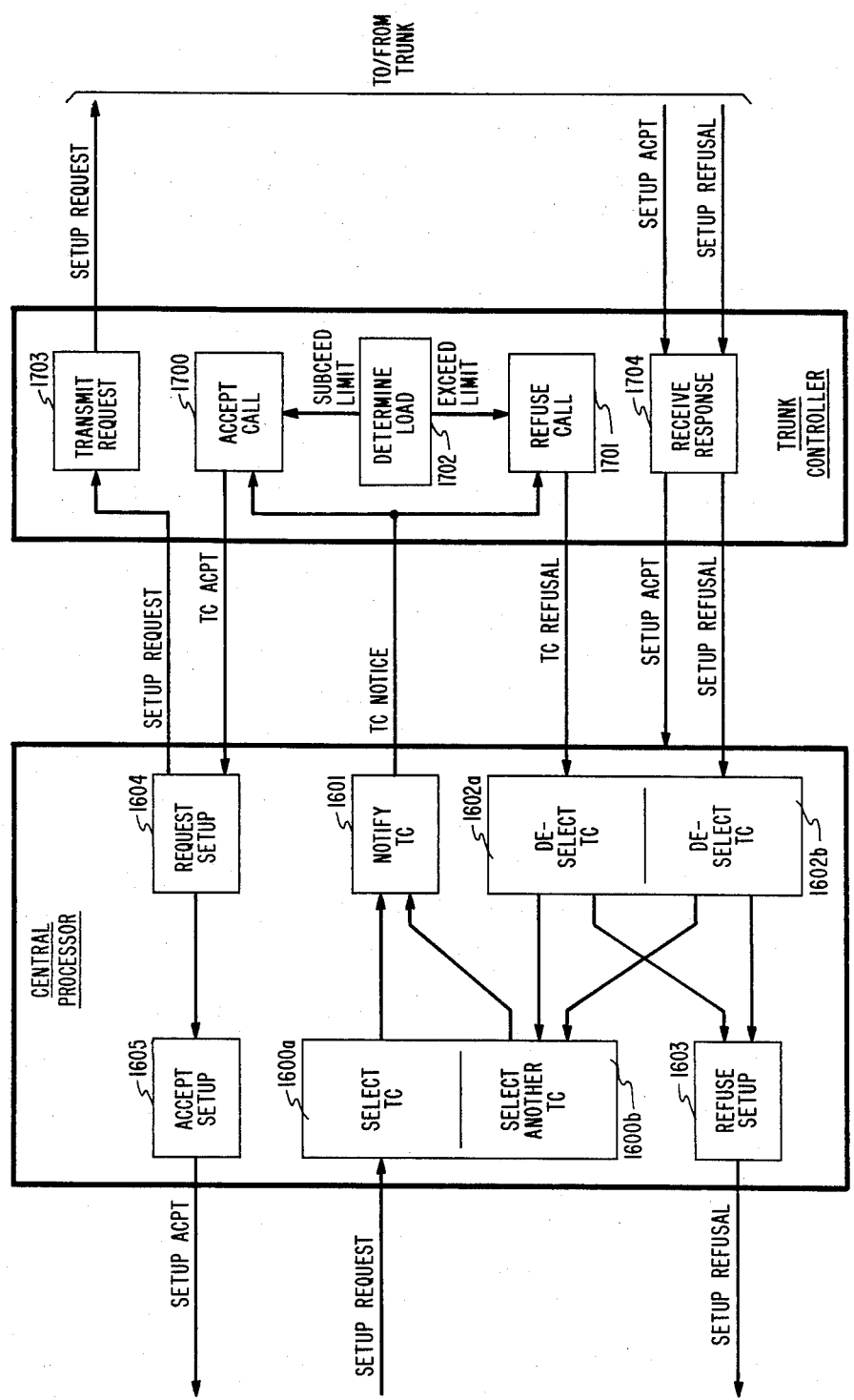
FIG. 3 is a high-level functional block diagram of an illustrative central processor and an illustrative trunk controller, and interaction therebetween, of the packet switching system of FIGS. 1A and 1B.

It is the cooperation of an office's central processor and the office's trunk controllers that results in calls being routed through the office and to the next office along a path that avoids trunk controller overload. The high level block diagram of FIG. 3 represents the major function blocks of a representative central processor and a representative trunk controller of an office, and their interrelationship, involved in setting up a path for a call through an office. Each block of FIG. 3 may be implemented either in separate circuitry or as a program or a function executed by a processor on a time-shared basis.

Considering FIG. 3, receipt of a call path setup request, such as from a preceding office, at the illustrative central processor activates a function 1600a that selects a trunk controller to serve the call. Selection of a trunk controller leads to activation of a function 1601 of the central processor, which function sends a notice to the selected trunk controller to notify it of its selection.

Receipt of the notice at the illustrative selected trunk controller activates either a call acceptance function 1700 or a call refusal function 1701, depending on whether a function 1702 charged with determining the traffic load being served by the trunk controller determines that the controller's load subceeds or exceeds a predetermined limit. If the limit is subceeded, the call acceptance function 1700 is activated and it signals to the illustrative central processor acceptance by the trunk controller to serve the call. If the limit is exceeded, the call refusal function 1701 is activated and it signals to the central processor refusal by the trunk controller to serve the call.

Receipt of a trunk controller refusal to serve the call activates in the central processor a function 1602a that de-selects the selected trunk controller. De-selection by the function 1602a leads either to activation of a function 1600b to select another trunk controller or of a function 1603 to refuse the call setup request that was initially received by the central processor. Which of the functions 1600b and 1603 is activated depends upon factors such as the availability for selection of another trunk controller.

If the function 1600b is activated, it selects another trunk controller to serve the call. Then the function 1601 is again activated to notify the selected controller.

If the function 1603 is activated, it returns a call path setup refusal to the source of the received call path setup request.

Receipt of a trunk controller acceptance to serve the call activates in the central processor a function 1604 that sends a call path setup request to the selected trunk controller. The function 1604 also activates a function 1605 which returns a call path setup acceptance to the source of the initially-received call path setup request.

Receipt of the call path setup request at the illustrative selected trunk controller activates a function 1703 that transmits the call path setup request to a succeeding office, for example, over the trunk that is connected to the controller. Arrival at the trunk controller of a call path setup acceptance or a call path setup refusal over the controller's trunk in response to the transmitted call path setup request activates a function 1704 which receives the response and sends it to the central processor.

Arrival of the call path setup acceptance at the central processor indicates that the portion of the call path for which this central processor is responsible has been set up, and hence the central processor need not engage in further call path setup activity.

Arrival of the call path setup refusal at the central processor activates a function 1602b which deselects the selected trunk controller. De-selection by the function 1602b leads either to activation of the function 1600b to select another trunk controller or of the function 1603 to refuse the call setup request initially received by the central processor. Which of the functions 1600b and 1603 is activated depends upon factors such as the availability for selection of another trunk controller whose associated trunk leads to a different succeeding office than the office which returned the call path setup refusal.

Further details of the above-described structure and functions will become clear from the following detailed description of the configuration of the trunk controller and the operation of both the trunk controller and the central processor.

Figure 4:
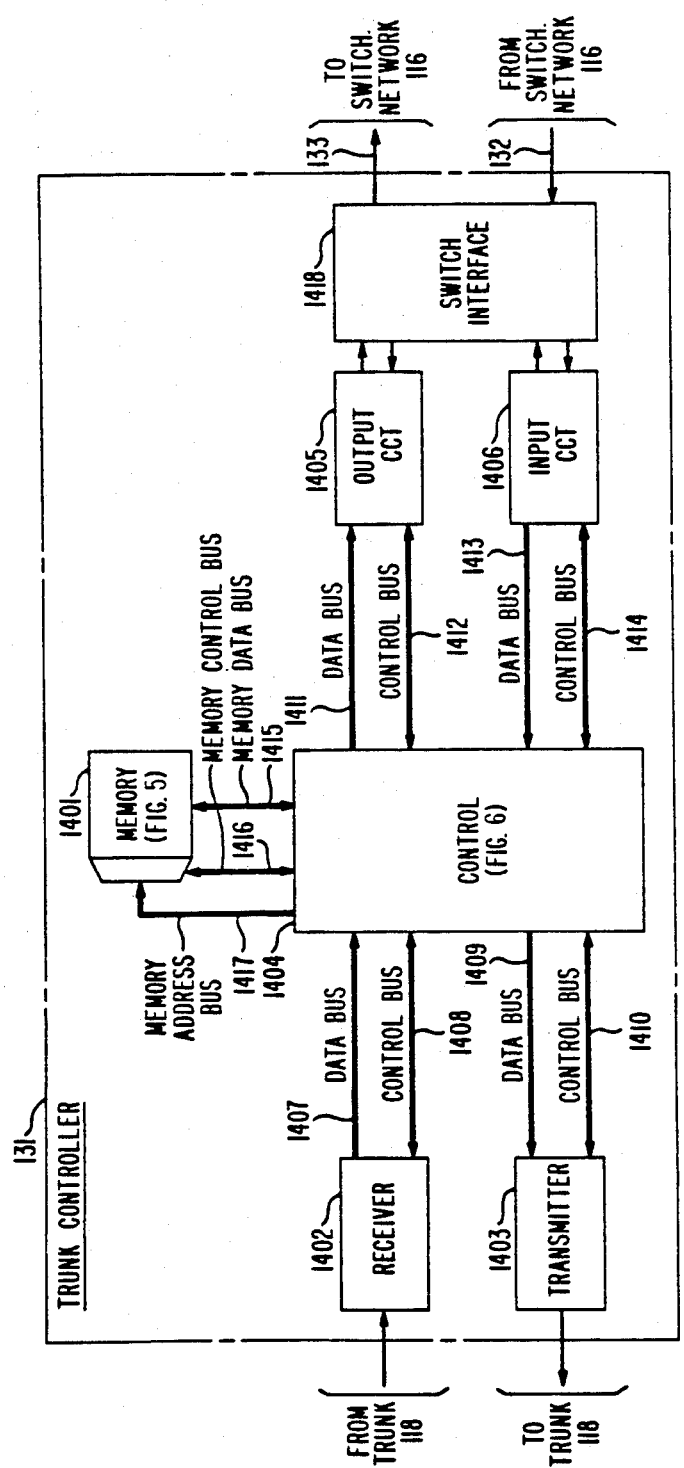
FIG. 4 is a block diagram of the trunk controller of FIG. 3.

The structure of a representative trunk controller 131 is shown in FIG. 4. The other trunk controllers are similar to trunk controller 131. Trunk controller 131 receives packets from trunk 118 via receiver 1402, and transmits packets to trunk 118 via transmitter 1403. Trunk 118 is illustratively a telephone digital transmission facility with a data transmission rate of 1.544 Mb/s as described in Boyle, Colton, Dammann, Karafin, and Mann, "Transmission/Switching Interfaces and Toll Terminal Equipment", 56 *The Bell System Technical Journal* 1057, 1058 (1977). Receiver 1402 and transmitter 1403 are interfaced to the DSX-1 unit shown in FIG. 1 on page 1058 of the cited article. Trunk controller 131 transmits packets to switching network 116 via output circuit 1405, and receives packets from switching network 116 via input circuit 1406. Switch interface 1418 interfaces the input and output circuits to the switch network. Trunk controller 131 includes a memory 1401 containing buffers for temporarily storing received packets, and a translation table for converting logical addresses conveyed by packets that it receives over the trunk 118 into switch addresses which are used by the switching network 116 to route the packets to a destination trunk controller that subtends the switching network 116. Packets are transferred in and out of the four circular buffers in memory 1401 via control 1404. Control 1404 contains pointers to the circuit buffers that allow input circuit 1406, output circuit 1405, transmitter 1403, and receiver 1402 to read and write memory 1401.

Consider an example where normal data packets are transferred from trunk 118 to switching network 116. Incoming packets are received by receiver 1402 in a serial fashion at a 1.544 Mb/s rate. Receiver 1402 transforms the serial information into a byte. Once it has assembled a byte, it transmits a write request, via control bus 1408, to control 1404. Receiver 1402 then writes the byte into memory 1401 via data bus 1407 and control 1404. The location in memory 1401 that the byte is written into is designated by the address pointers indicated with receiver 1402. This process continues until receiver 1402 has transferred an entire packet into memory 1401. After receiver 1402 has received and written into memory 1401 an entire packet, it transmits an end-of-packet signal, via control bus 1408, to control 1404. Control 1404 then transmits a packet-available signal, via control bus 1412, to output circuit 1405. This packet-available signal is transmitted as long as there is a complete packet in memory 1401.

Output circuit 1405 reads the packet bytes stored in memory 1401 by making sequential read requests to control 1404 via control bus 1412. Control 1404 maintains a pointer that determines which word in memory 1401 is associated with the packet to be transmitted into the network via output circuit 1405. Output circuit 1405 assembles accessed bytes into packets and transmits the packets at an 8 Mb/s rate. In order to transmit the packets to switching network 116, output circuit 1405 uses a logical address field from the original packets to address the logical translation table to obtain therefrom the switch destination addresses of the packets.

Consider another example where packets are transferred from switching network 116 to trunk 118. Packets from switching network 116 are received by input circuit 1406 via switch interface 1418. Input circuit 1406 forms this data into bytes. It then sends a write request via control bus 1414, and sends the bytes via data bus 1413, to control 1404. Control 1404 writes the information into memory 1401, via memory address bus 1417, memory data bus 1415, and memory control bus 1416. When an entire packet has been stored in memory 1401, input circuit 1406 transmits an end-of-packet signal to control 1404 via control bus 1414. Control 1404 then transmits a packet-available signal to transmitter 1403 via control bus 1410. Transmitter 1403 makes a read request to address control 1404, and receives the packet bytes via data bus 1409. Transmitter 1403 transforms the bytes into packets and transmits them to trunk 118 at a 1.544 Mb/s rate.

Figure 5:
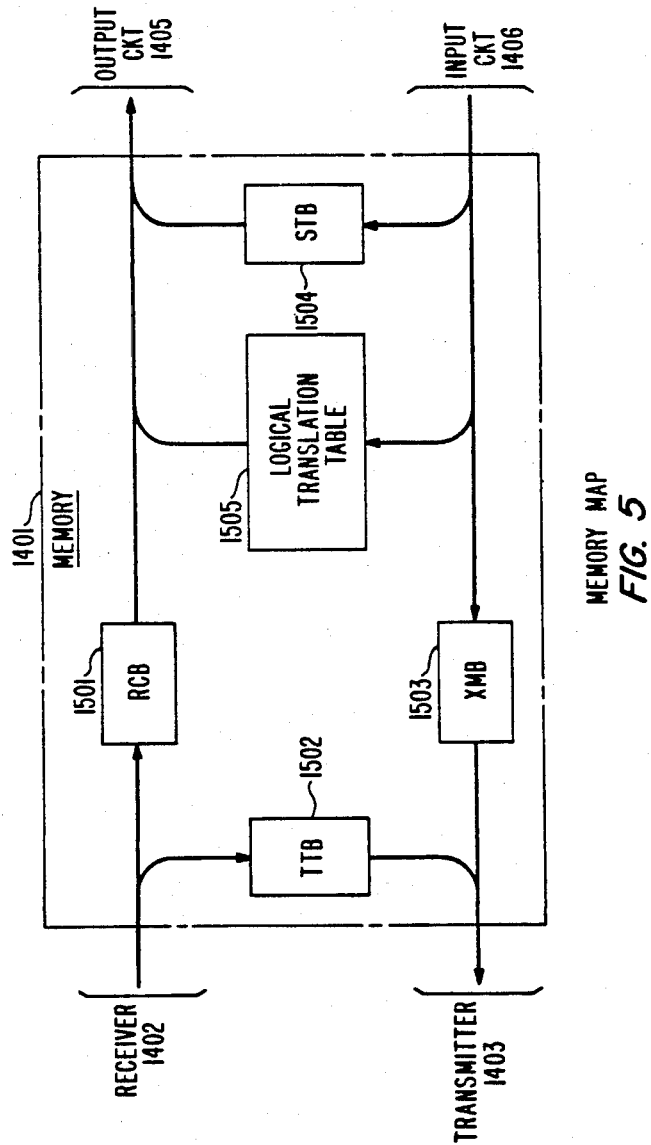
FIG. 5 is a block diagram of the memory of the trunk controller of FIG. 4.

FIG. 5 illustrates the four packet buffers and logical channel translation table contained in memory 1401. Packets arriving from receiver 1402 are written into either receive buffer (RCB) 1501 or trunk test buffer (TTB) 1502. Trunk test buffer 1502 is reserved for test packets that are to be looped back over the trunk. All other arriving packets are sent to receive buffer 1501. Packets arriving from input circuit 1406 are written into either transmit buffer (XMB) 1503 or switch test buffer (STB) 1504. Transmit buffer 1503 is for packets that are to be transmitted on the trunk via transmitter 1403. Switch test buffer 1504 is for switch test packets, and for memory read and write packets. Logical translation table 1505 contains the logical-to-physical address translation information received from the central processor 115 via memory write packets.

Figure 6:
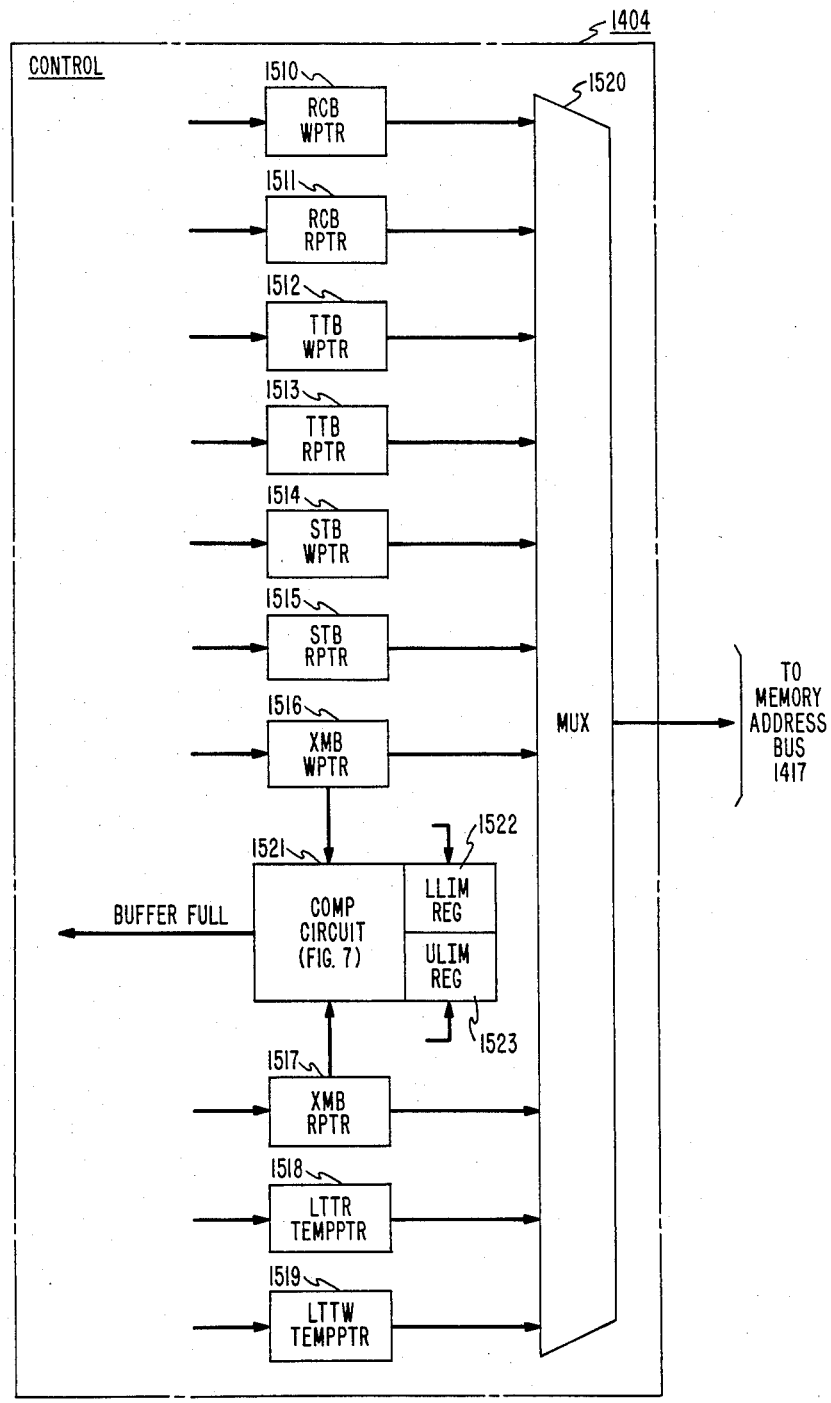
FIG. 6 is a block diagram of an illustrative embodiment of the control of the trunk controller of FIG. 4.

The reading and writing of the circular buffers 1501–1504 and of the logical translation table 1505 in memory 1401 is controlled by read and write pointers 1510–1519, shown in FIG. 6, that are located in control 1404. These read and write pointers point to the specific memory locations within the various buffers and table. Read or write pointers are provided for receiver 1402, transmitter 1403, input circuit 1406 and output circuit 1405. These pointers are used to read or write the various circular buffers, depending on the circuit. The structure is as follows: Receiver 1402—receiver buffer write pointer (RCBWPTR) 1510 and trunk test buffer write pointer (TTBWPTR) 1512; output circuit 1405—receive buffer read pointer (RCBRPTR) 1511 and switch test buffer read pointer (STBRPTR) 1515; input circuit 1406—transmit buffer write pointer (XMBWPTR) 1516 and switch test buffer write pointer (STBWPTR) 1514; transmitter 1403—transmit buffer read pointer (XMBRPTR) 1517 and trunk test buffer read pointer (TTBRPTR) 1513.

Input circuit 1406 also has access to temporary logical translation table write pointer (LTTWTEMPPTR) 1519, which is used during memory write operations. Output circuit 1405 has access to a temporary logical translation table read pointer (LTTRTEMPPTR) 1518, which is used during memory read operations. To enable the use of the pointers 1510–1519 for addressing the memory 1401, the pointers 1510–1519 are coupled to the memory address bus 1417 via a multiplexer 1520.

Memory write packets are used to write information into memory 1401. This information includes the logical-to-physical address translations, which are written into logical translation table 1505. Memory write packets are originated by the central processor 115, and are sent to input circuit 1406, which writes part of the packet into switch test buffer 1504, and part of the packet into logical translation table 1505. The portion of the memory write packet that is written into switch test buffer 1504 is written via the switch test buffer write pointer 1514; the portion of the packet that is written into logical translation table 1505 is written via the temporary logical translation table write pointer 1519. Output circuit 1405 then reads the information stored in switch test buffer 1504 by using the switch test buffer read pointer 1515 and reads the logical translation information from the logical translation table 1505 by using the temporary logical translation table read pointer 1518. It then assembles these two portions of data into a packet that is identical to the original memory write packet, and transmits this packet back to the central processor.

Memory read packets are originated by the central processor 115, and are used to allow the central processor 115 to read portions of memory 1401. The incoming memory read packet contains the memory address and the number of bytes to be read. Output circuit 1405 reads memory 1401 at the address specified in the packet, and inserts the number of bytes specified into the memory read packet. It then returns the packet (containing the requested data) to the central processor 115.

Any of a number of alternative arrangements may be used to determine the communication traffic load of a trunk controller. One such arrangement is indicated in FIG. 6. This arrangement determines the traffic load of the trunk controller 131 as a function of the occupancy of its transmit buffer 1503. Data is entered in the transmit buffer 1503 at an 8 MHz rate, but is transmitted out at only a 1.544 MHz rate. Hence the transmit buffer 1503 may be considered to be the bottleneck that controls whether or not the trunk controller 131 can serve more calls.

Incoming data is written in the transmit buffer 1503 at a location pointed to by the transmit buffer write pointer 1516. Outgoing data is read out of the transmit buffer 1503 at a location pointed to by the transmit buffer read pointer 1517. Hence the difference between the pointers 1516 and 1517 indicates the number of occupied locations in the buffer 1503. This number, divided by the total number of memory locations of the buffer 1503, indicate the occupancy of the buffer 1503.

The computations involved in determining the traffic load of the trunk controller are performed in the example of FIG. 6 by a comparator circuit 1521. One such circuit is included in each trunk controller. The circuit 1521 is connected to the transmit buffer read and write pointers 1516 and 1517. The circuit 1521 functions in the manner shown in FIG. 7. When the address contained in the transmit buffer write pointer (XMBWPTR) 1516 is greater than or equal to the address contained in the transmit buffer read pointer (XMBRPTR) 1517, as determined n block 401, the circuit 1521 subtracts the contents of the read pointer 1517 from the contents of the write pointer 1516 and divides the difference by the total number of memory locations included in the transmit buffer (XMB) 1503, as indicated in block 402, to obtain the occupancy of the buffer 1503. As was mentioned above, the buffer 1503 is a circular buffer; hence when the buffer 1503 "wraps around" and the address contained in the read pointer 1517 is greater than the address contained in the write pointer 1516, as determined in block 401, the circuit 1521 subtracts the contents of the write pointer 1516 from the contents of the read pointer 1517, divides the difference by the total number of memory location included in the transmit buffer 1503, and subtracts the result from one, as indicated in block 403, to obtain the occupancy of the buffer 1503.

Having computed the occupancy of the transmit buffer 1503, the comparator circuit 1521 compares the occupancy with a predetermined load level to determine whether the buffer 1503 is considered to be full. The choice of the predetermined load level depends upon the characteristics and desired performance of the particular system. For example, the level may be set at 80 percent of the buffer capacity. This computation has a certain amount of hysteresis in order to avoid oscillations in the BUFFER FULL indication. In other words, once the buffer is considered to be full, it must empty out beyond the point at which it became considered full before it is considered again to not be full. Similarly, once the buffer is considered to be not full, it must fill up beyond the point at which it became considered not full before it is considered again to be full. For this purpose, the comparator circuit 1521 includes a pair of registers 1522 and 1523 (see FIG. 6) which hold the lower limit (LLIM) and upper limit (ULIM), respectively, of the transmit buffer's predetermined load level. For example, if the predetermined load level is chosen to be 80 percent of buffer capacity, the lower limit may be chosen at 70 percent of buffer capacity and the upper limit as 90 percent of buffer capacity.

When the buffer 1503 is determined to be full, the comparator circuit 1521 generates a BUFFER FULL signal for use by the control 1404. While this signal is asserted, i.e., generated, as determined at block 404, the comparator circuit 1521 compares the computed load of the buffer 1503 with the lower load limit, as indicated in block 405, and ceases to assert the BUFFER FULL signal only when the load subceeds, i.e., is less than, the lower load limit, as indicated in block 406. Once it ceases to assert the BUFFER FULL signal and while that signal is deasserted, as determined at block 404, the comparator circuit 1521 compares the computed load of the buffer 1503 with the upper load limit, as indicated in block 407, and reasserts the BUFFER FULL signal only when the load exceeds the upper load limit, as indicated in block 408. The comparator circuit 1521 may be activated to perform the calculations by the control 1404 in response to receipt by the trunk controller 131 of a request to handle a call. Or the comparator circuit 1521 may perform the calculation continuously and automatically.

Figure 7:
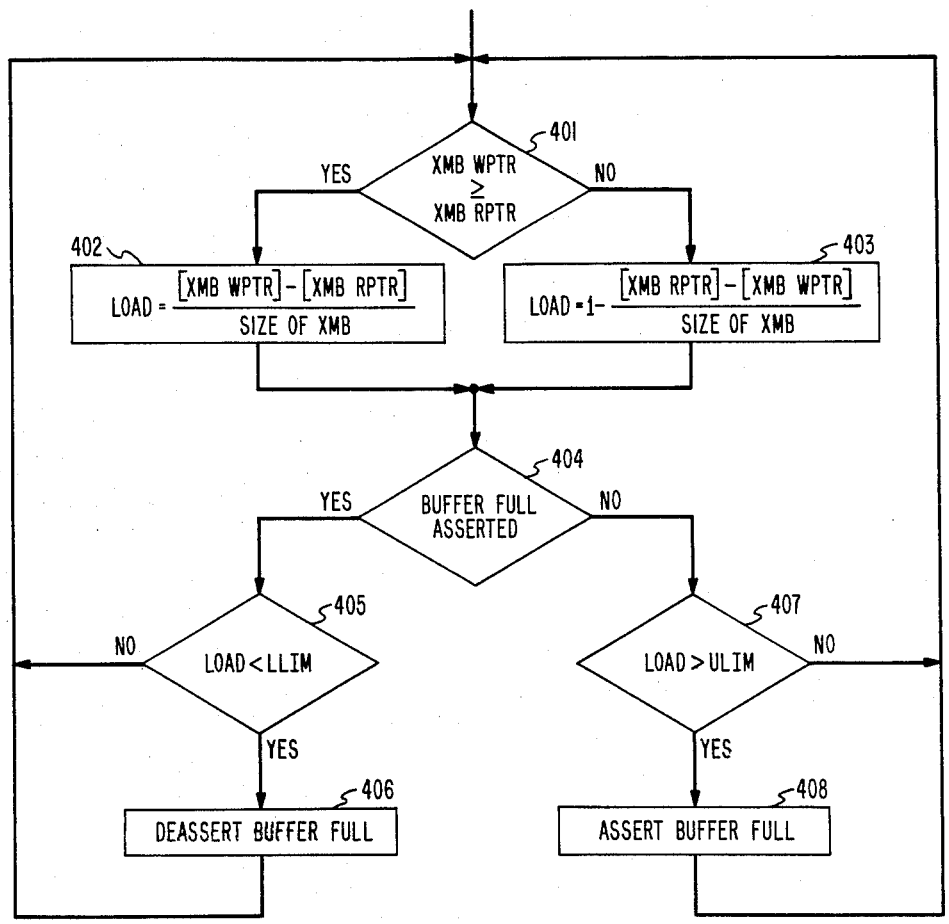
FIG. 7 is a function diagram of the comparator circuit of the control of FIG. 6.
Figure 9B:
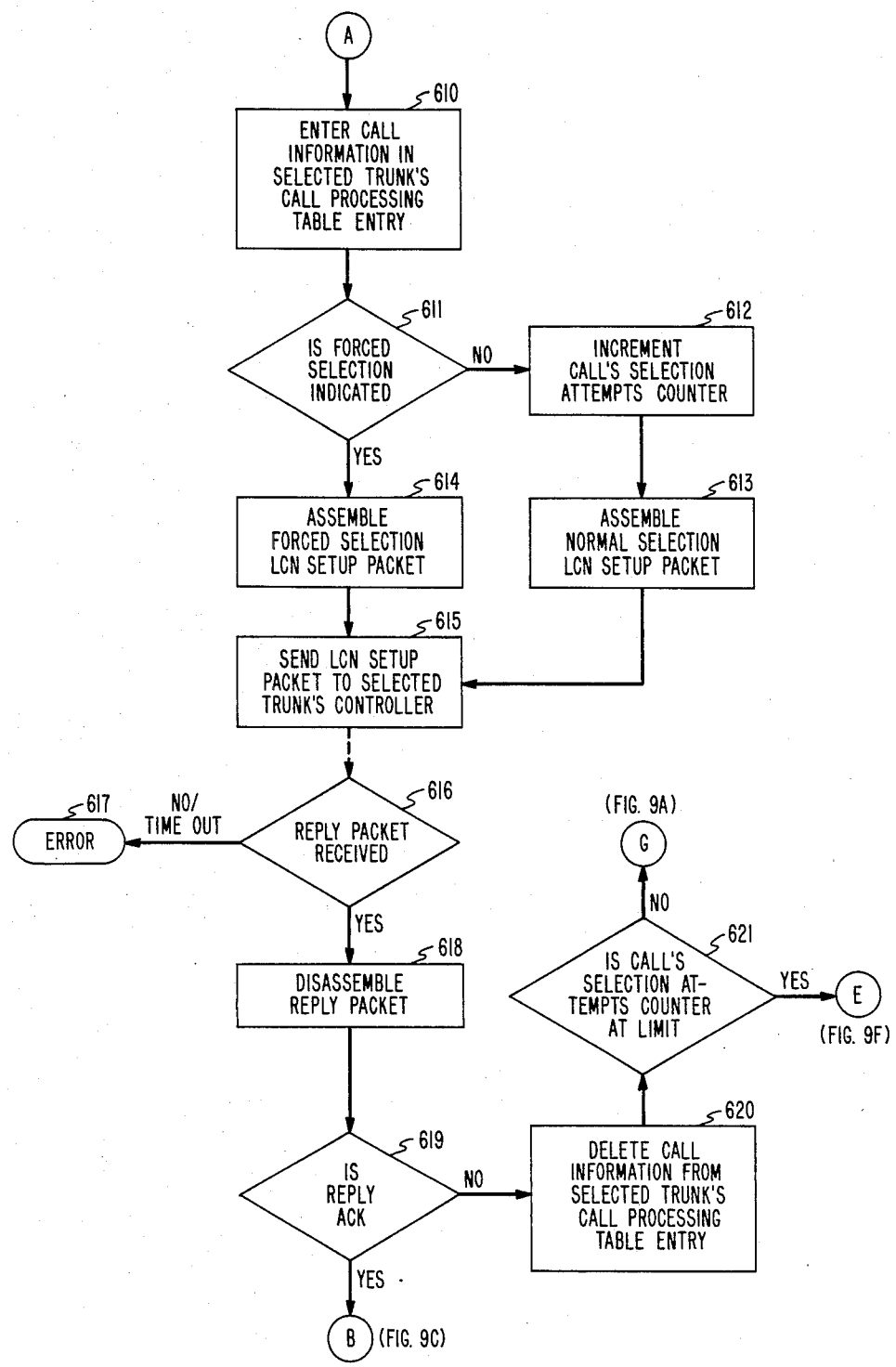
Figure 9C:
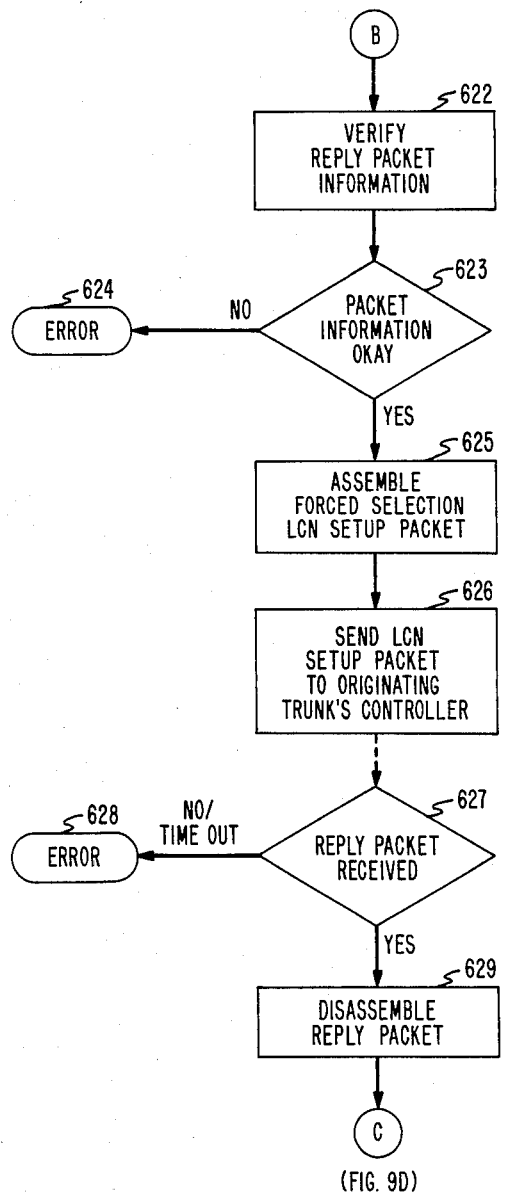
Figure 9D:
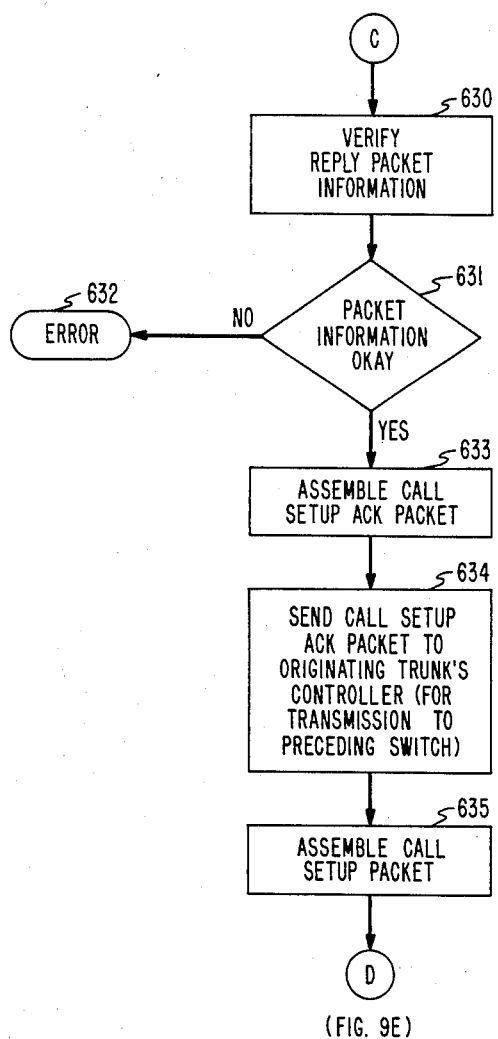
Figure 9E:
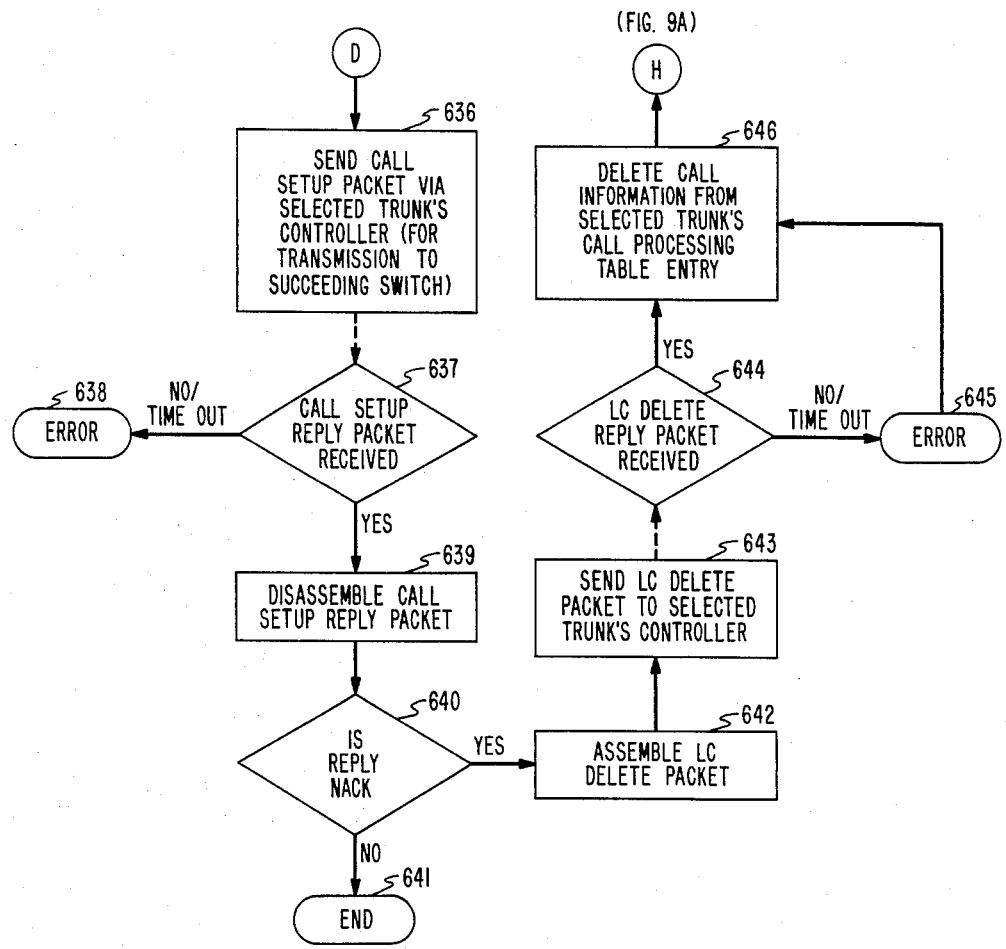

The arrangement for calculating the traffic load of a trunk controller shown in FIGS. 6 and 7 and described above is one of a number of suitable arrangements that may be used. Another example of a suitable arrangement is one which monitors the output of the transmitter 1403 and determines the traffic load as a function of the percentage of time during which the transmitter 1403 is active, i.e., transmitting on the trunk 118. This arrangement may be implemented as a counter that counts up when the transmitter 1403 is active and counts down when the transmitter 1403 is idle, for a prescribed period.

Turning now from the switch functions and structure, the procedure for obtaining and storing call self-routing information in address memories of the appropriate address line controllers, trunk controllers, and central processors is described. The information is obtained from a call setup packet that is transmitted from the appropriate access line controller connected to the originating customer unit through the various microprocessors and central processors which are associated with the different concentrators and through local and toll offices which form the route that a packet must traverse in order to reach the destination customer unit. A call setup packet is in effect a request to a node, such as a switch or a concentrator, of the switching system to serve a particular call. As the call setup packet progresses along this route, each processing entity inserts a new logical address into the packet and stores the necessary logical and switch address information in the appropriate access line controller or trunk controllers. Once the call setup packet is received at the microprocessor attached to the concentrator to which the destination customer unit is connected via an access line controller, the receiving microprocessor transmits the appropriate logical and switch address information to the connected access line controller which stores it in its address memory, and the receiving microprocessor assembles and transmits a call reply packet which indicates that the call has been properly set up. After the call reply packet is received by the originating customer access line controller, all the necessary routing information is stored in the access line controllers and trunk controllers forming the packet route so that packets can be directly routed through the switching networks without the packets having to be served by the associated processing entities.

The use of the call setup packet is now illustrated in greater detail by describing the establishment of a telephone call between customers 100 and 110. Customer 100 calls customer 110 by dialing the customer 110 telephone number. Resident interface 127 collects the dialed digits in the conventional manner. After resident interface 127 has collected the dialed digits, it transmits the dialed digits in a packet via line 122 to access line controller 112a. In response to the packet received from resident interface 127, access line controller 112a assembles and transmits the packet 500a shown in FIG. 10A to microprocessor 111 via concentrator 112.

Figure 10A:
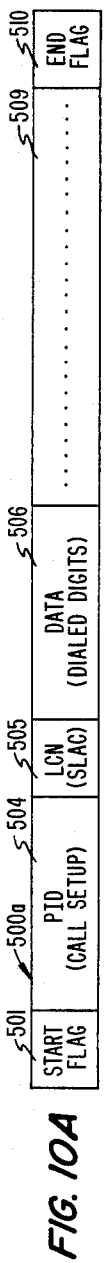
FIGS. 10A through 10U are block diagrams of various packets used in the packet switching system of FIGS. 1A and 1B to perform call path setup.

As shown in FIG. 10A, the packet 500a is functionally divided into a plurality of fields. In this, the packet 500a is representative of all packets. The start flag 501 and end flag 510 fields are unique bit patterns used to identify the beginning and end of a packet. The packet identifier (PID) field 504 identifies this packet 500a as a call setup packet. The logical channel number (LCN) field 505 identifies the source address(S) of the packet, which in this example is the line access control (LAC) 112a. The data field 506 contains the dialed telephone number. Other fields 509, such as time stamps and error checking codes, may be included in the packet 500a as well.

Figure 10B:
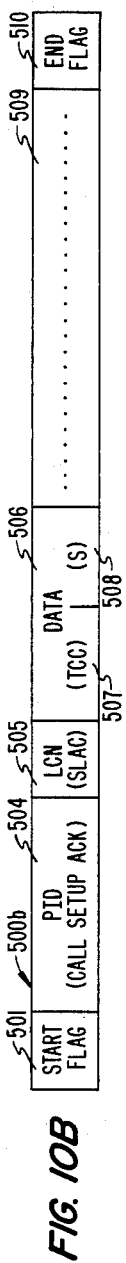

Upon receipt of the packet 500a of FIG. 10A, microprocessor 111 examines the dialed telephone number and determines that a connection is required through switching network 116. First, microprocessor 111 assembles and transmits to access line controller 112a a call setup acknowledgment packet 500b shown in FIG. 10B. A call setup acknowledgment packet is in effect an acceptance by a node of the switching system to serve a particular call. It indicates to its recipient that the sender has performed the activities necessary for it to serve the call. The PID field 504 identifies the packet 500b as a call setup acknowledgment. The LCN field 505 duplicates that field of the packet 500a and thus indicates which call setup packet is being acknowledged. And the data field 506 is subdivided into two subfields 507 and 508. The subfield 508 carries a new logical address(S) which is associated with the concentrator 112 and which is to be used in subsequent packets to identify this particular call. The field 507 carries the switch address (TCC) defining concentrator 112's internal trunk controller which connects trunk 117 to concentrator 112. This switch address is used by concentrator 112 to route subsequent packets of this call to trunk 117.

Figure 10C:
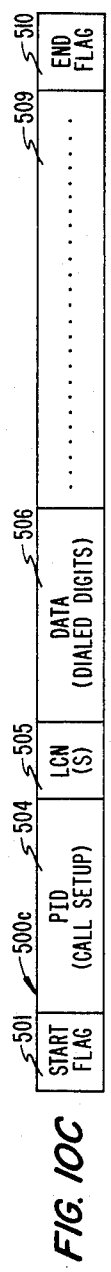

Next, microprocessor 111 stores in the logical translation table of the memory of concentrator 112's internal trunk controller the switch address identifying access line controller 112a and information defining the virtual, i.e., logical, channel or address to be used by access line controller 112a in communicating with resident interface 127. This information is saved in a logical translation table entry with respect to which the logical channel number serves as a pointer. Finally, the microprocessor 111 assembles the packet 500c shown in FIG. 10C. The packet 500b is like the packet 500a, but has in the logical channel number field 505 the logical address which had been stored in the address memory of access line controller 112a. This new packet 500c is then transmitted to trunk controller 130, via concentrator 112 and trunk 117.

Referring by analogy to FIG. 4, at the trunk controller 130 the packet 500c is received over the trunk 117 by the trunk controller's receiver. The receiver forwards the PID field 504 to the trunk controller's control. The control determines from the PID field 504 that the packet 500c is a call setup packet, and therefore causes the packet to be stored in the receive buffer. When the receiver notifies the control that the whole packet has been received, the control notifies the transmit controller's output circuit that a packet is available for transmission to the central processor (CP) 115.

Figure 10D:
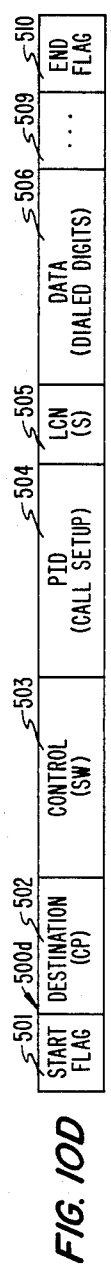

In response, the output circuit reads the packet stored in the receive buffer and assembles therefrom the packet 500d shown in FIG. 10D. As is there shown, the packet 500d includes the fields and information conveyed by the packet 500c. In addition, the packet 500d includes a destination field 502 which contains the switching network 116 address of the central processor 115 indicating to the network 116 where to route the packet 500d. In this case, the destination field 502 contains the network address of the trunk controller 129. But since the controller 129 only communicates with the central processor 115, this address identifies the destination of the packet 500d as being the central processor 115. The packet 500d also includes a control field 503 which identifies the packet 500d to the central processor 115. In this example the control field 503 identifies the packet as a switch packet. Switch packets carry data and maintenance information within a switch.

Following assembly of the packet 500d, the output control of the trunk controller 130 transmits the packet 500d to the central processor 115, via link 134, switching network 116, and trunk controller 129. The network 116 uses the destination field 502 to switch the packet 500d from the source, or originating, trunk controller 130 to the trunk controller 129. The trunk controller 129 buffers the packet 500d, strips off the start and stop fields 501 and 510 and the destination field 502, and forwards the remainder of the packet 500d to the central processor 115.

The activities of the central processor 115 in setting up the call path are diagramed in logical flow form in FIG. 9. The central processor 115 performs the activities of FIG. 9 by executing programs stored in its memory. The programs of the central processors of all switches in the system of FIGS. 1A and 1B are for purposes of this application substantially the same.

Upon receipt of the packet 500d, at block 600, central processor 115 disassembles the packet 500d, at block 601, to extract the information carried by its fields. The field 503 identifies the packet 500d as a switch packet and the PID field 504 identifies it as a call setup packet;

therefore the central processor 115 associates a portion of its temporary, scratchpad, memory with the call identified by the logical channel number field 505, and stores the information conveyed by the packet 500d in that associated scratchpad memory, at block 602. And to keep track of which trunks and associated trunk controllers are handling which calls, the central processor 115 conventionally enters information about the call, such as a record of its existence, its scratchpad memory entry's address, and its assigned logical channel number, in an entry of a conventional call processing table which entry is associated with the source trunk 117, at block 603. Since trunks have trunk controllers uniquely associated with them, this is equivalent to having call processing table entries associated with trunk controllers and storing the call information in the entry of the trunk controller 130.

From the dialed telephone number carried by the data field 506, the central processor 115 determines at block 604, by performing conventional table look-up operations in conventional translation and call processing tables stored in its memory, that the preferred path for the call leads through the office 104. The office 104 is the selected succeeding switch after the office 102 in the call's path. Having selected office 104 as the destination for the call, the processor 115 checks its data base at block 605 to determine whether the office 104 is available, i.e., whether there is a connection from the office 102 to the office 104 and whether the office 104 is functional.

If the office 104 is not available, the office 102 cannot complete the call path through the office 104. Therefore the processor 115 again performs table look-up operations to determine at block 606 if the call can be routed through an alternative switch. If so, the processor 115 returns to the block 604 to select another succeeding switch, for example the switch 105, through which to route the call, and checks at block 605 whether this switch is available. The processor 115 performs these operations until it finds an available switch or until it determines at block 606 that there are no alternative succeeding switches left to select from.

In the case where there are no alternative succeeding switches left to select from, the office 102 cannot route the call. And because the office 102 is a local office—the only office to which a customer is directly connected—the call cannot be handled at all, at block 647. Hence the central processor 115 of the local office 102 aborts the call at block 64Q in a conventional manner, such as by causing a busy tone to be returned to the customer 100 and by deleting the call information from the call processing table entry of the originating trunk 117.

Returning to a consideration of block 605, if a selected succeeding switch is available to the switch 102, the central processor 115 selects a destination trunk and a logical channel number associated with the selected trunk to assign to the call, at block 607. Since trunks have trunk controllers uniquely associated with them, this is equivalent to selecting a trunk controller and a logical channel number associated therewith to serve the call. The central processor 115 again accomplishes this by performing conventional table look-up operations in translation and call processing tables. Let it be assumed that the selected and available destination switch is the toll office 104. Then the selected trunk is one of the trunks connecting the office 102 with the office 104, for example the trunk 118.

The trunk may be selected on the basis of any desirable criterion, such as the round-robin fashion described in the background portion of this application.

Having selected a trunk leading to the office 104, the processor 115 checks its data base at block 608 to determine whether the selected trunk is available, i.e., whenever the selected trunk and its associated trunk controller are present and functional.

If the selected trunk is not available, the office 102 cannot complete the call path over the selected trunk. Therefore the processor 115 again performs table look-up operations to determine if there are other, alternative, trunks leading to the office 104, at block 609. If so, the processor 115 returns to the block 607 to select another one of these trunks through which to route the call, and checks at block 608 this trunk's availability. The processor 115 performs these operations until it finds an available trunk or until it determines at block 609 that there are no alternative trunks left to select from.

In the case where there are no alternative trunks left to select from, the call cannot be routed through the switch 104 and the processor 115 returns to block 606 to determine whether there is an alternative succeeding switch through which the call may be routed.

Returning to a consideration of block 608, if a selected trunk leading to a selected succeeding switch is available, the processor 115 conventionally enters information about the call, such as a record of its existence, its scratchpad memory entry's address, and its assigned logical channel number, in the selected trunk's call processing table entry, at block 610. Again, since trunks have trunk controllers uniquely associated with them, this is the equivalent of keeping entries in call processing tables on the basis of trunk controllers instead of trunks and storing the call information in the selected trunk controller's entry.

Next, the processor 115 determines whether the selection of the destination trunk is forced or normal, at block 611. Forced selection means that the selected destination trunk's trunk controller is not allowed to refuse to serve the call and is forced to serve the call. Normal selection means that the selected trunk controller may refuse to serve the call if it is serving a call traffic load that exceeds a predetermined limit. At the local office 102, the determination of the type of selection may be made on the basis of one or more relevant criteria, such as the identity of the selected succeeding switch, the characteristics of the selected trunk and trunk controller, the type of call that is being processed, or the class of service being provided to the customer 100. As will be seen from the discussion that follows, the type of selection is thereafter indicated to succeeding toll offices by information included in the call setup packet.

If forced selection is not indicated, the processor 115 increments the contents of a memory location in the scratchpad memory area associated with the call, at block 612. This memory location acts as a counter, counting the number of path selection attempts that have been made on behalf of the call. Then the processor 115 assembles at block 613 the packet 500e shown in FIG. 10E.

The packet 500e is similar to the one shown in FIG. 10D in terms of the fields that it includes. However, the contents of some of these fields are different. In particular, the destination field 502 of packet 500e contains the switch address (TCD) of the selected destination trunk's controller. Let it be assumed that the selected available trunk is the trunk 118. Then the destination field 502 of packet 500e contains the switch address of the destination trunk controller 131. Furthermore, the control field 503 identifies the packet 500e to the trunk controller 131 as a logical channel setup packet. And the PID field 504 contains not only the identification code of a call setup packet, but also indicates that trunk selection is normal (N), i.e., not forced (F). Hence the packet serves as a channel setup request. The logical channel number field 505 contains the logical channel number (D) associated with the destination trunk 118 that was selected by the processor 115 and assigned to this call at block 607. And the data field 506 is effectively subdivided into two subfields 507 and 508. The subfield 507 contains the switch address (TCS) identifying the source trunk controller 130, and the subfield 508 contains the logical channel number(S), i.e., logical address, of the controller 130 that was contained in the logical channel number field 505 of the packet 500d that was received by the processor 115.

Figure 10E:

Returning to the consideration of block 611 of FIG. 9, if forced selection is indicated, the processor 115 assembles packet 500e shown in FIG. 10E at block 614, the only difference from block 613 being that the PID field 504 indicates that trunk selection is forced (F). Hence the packet serves as a channel setup command.

Following assembly of the channel setup packet 500e at block 613 or 614, this new packet 500e is transmitted at block 615 to the trunk controller 131, via trunk controller 129 and switching network 116, to notify the trunk controller 131 of its selection to serve the call.

Referring to FIG. 4, at the trunk controller 131 the packet 500e is received through the switch interface 1418 by the input circuit 1406. The input circuit 1406 forwards the contents of the control field 503 and the PID field 504 to the control 1404.

Figure 8:
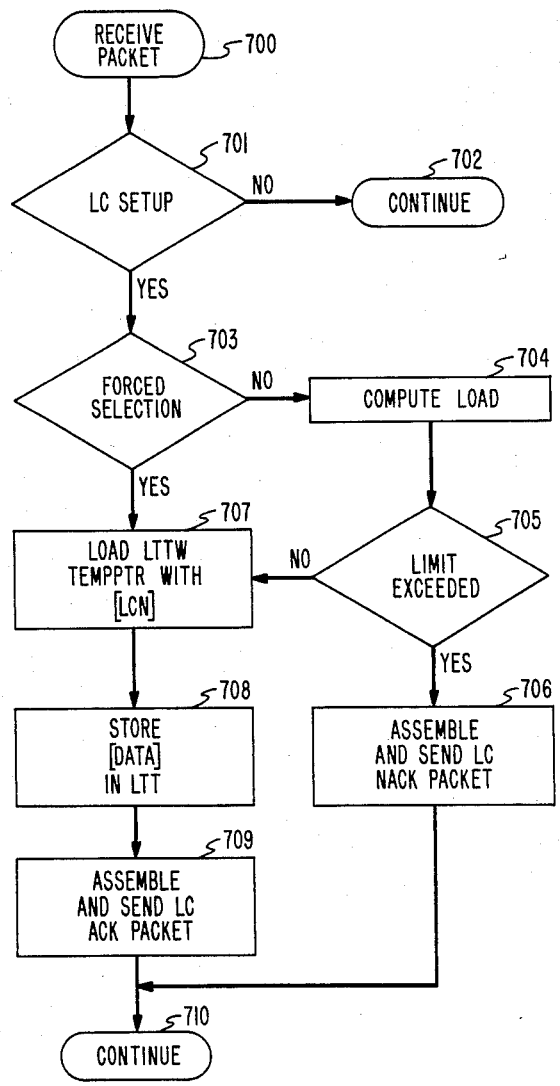
FIG. 8 is a logical flow diagram of the call path setup of the trunk controller of FIG. 4.

The activities of the control 1404 in response to the packet 500e are diagramed in logical flow form in FIG. 8. The control 1404 may have hard wired circuits to perform the functions of FIG. 8. Or the control 1404 may be a microprocessor performing the functions of FIG. 8 by executing programs stored in its memory. Upon receipt of the packet 500e at the trunk controller 131, at block 700, the control 1404 examines the control field 503 and determines therefrom that the packet 500e is a logical channel setup packet, at block 701. Thus the control 1404 knows that trunk controller 131 has been selected to serve a call. If the packet 500e were not a logical channel setup packet, it would be processed by the control 1404 in a conventional manner, at block 702. Having determined that the packet 500e is a logical channel packet, the control 1404 checks at block 703 the contents of the PID field 504 to determine if normal or forced selection is indicated. If normal selection is indicated at block 703, whether or not the trunk controller 131 will accept or reject serving of the call is a function of what the traffic load being served by the controller 131 is computed to be at block 704. If normal selection is indicated, the control 1404 checks at block 705 the state of the BUFFER FULL indication (see FIG. 6) to determine whether the traffic load of the trunk controller 131 exceeds the predetermined load.

Figure 10F:
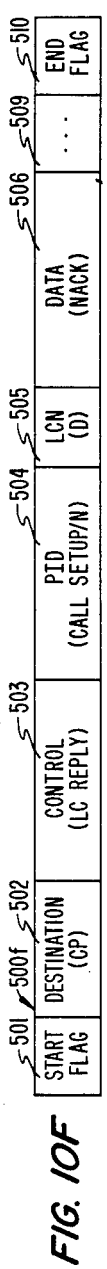

If the BUFFER FULL signal is asserted, indicating that the traffic load of the trunk controller 131 exceeds the predetermined load, at block 706, the control 1404 causes the output circuit 1405 to assemble and return to the processor 115 a logical channel setup no-acknowl-edgment (LCNACK) packet 500f shown in FIG. 10F. An LCNACK packet signals refusal by a trunk controller to serve the call and to set up the logical channel therefor. The packet 500f duplicates the contents of the fields 501, 503–505 and 509–510 of the logical channel setup packet 500e that was received by the input circuit 1406, but the contents of its destination field 502 are the switch address of the central processor 115 and the contents of its data field 506 indicate to the central processor 115 that the trunk controller 131 refuses to serve the call. The control 1404 then continues its conventional activities a block 710, for example awaiting receipt by the trunk controller 131 of another packet.

If normal selection is indicated at block 703 and the BUFFER FULL signal is not asserted at block 705, or if forced selection is indicated at block 703 by the PID field 504 of the packet 500e the control 1404 requests from the input circuit 1406 the contents of the logical channel number field 505 of the packet 500e and loads it into the logical translation table temporary write pointer 1519 at block 707. The logical channel number functions as an offset pointer into the logical translation table 1505, and the control 1404 causes the contents of the fields 507 and 508 of the packet 500e to be stored in the table 1505 at the entry specified by the logical channel number, at block 708. The stored information is subsequently used to perform the necessary logical-to-switch address translation on subsequent packets associated with the call whose path is being set up.

Figure 10G:
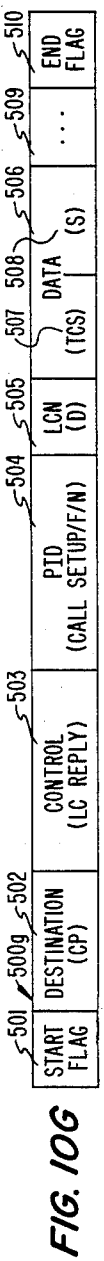

Following this, the control 1404 causes the output circuit 1405 to assemble and return to the processor 115 a logical channel acknowledgment (LCACK) packet 500g shown in FIG. 10G. An LCACK packet signals acceptance by a trunk controller to serve the call and to set up the logical channel therefor. This packet is a duplicate of the logical channel setup packet 500e received by the input circuit 1406, except that the contents of its destination field 502 are the switch address of the central processor 115.

Returning to a consideration of FIG. 9, following transmission of the logical channel setup packet 500e to the trunk controller 131 at block 615, the central processor 115 undertakes other activities, such as processing of other call setup requests, while it awaits a response from the trunk controller 131, at block 616. If the central processor 115 does not receive a response within a predetermined period of time, it treats the condition as an error at block 617, and handles it in a conventional manner.

If the central processor 115 does receive a timely logical channel setup reply packet from the trunk controller 131, at block 616, it disassembles the packet, at block 618, and examines its contents to determine at block 619 if the reply packet is an LCACK packet 500g or an LCNACK packet 500f.

If the response is an LCNACK packet 500f, indicating that the trunk controller 131 refuses to serve the call, the central processor 115 re-enters the call processing tables and deletes from the entry therein associated with the trunk 118 the information about this call, at block 620. Having thus de-selected the trunk 118 and the trunk controller 131 for serving the call, the central processor 115 accesses the scratchpad memory associated with the call and checks therein the selection attempts counter to determine if its count has exceeded a predetermined limit, at block 621. If the limit has not been exceeded, the central processor 115 returns to block 607 to select another trunk and logical channel number to serve the call. But if the limit has been exceeded, indicating that the maximum permissible number of attempts by the central processor 115 to find a path for the call from the local office 102 has been made, the central processor 115 of the local office 102 aborts the call, at block 649, in a conventional manner.

Returning to a consideration of block 619, if the reply packet received from the trunk controller 131 is the LCACK packet 500g indicating the trunk controller 131's acknowledgment of the channel setup packet and acceptance to serve the call, the central processor 115 at block 622 compares the contents of the packet 500g with the contents of the logical channel setup packet 500e to verify that the trunk controller 131 received and stored the correct information. If the comparison indicates a discrepancy, at block 623, the central processor 115 handles the error at block 624 in a conventional manner, for example by resending the packet 500e to the trunk controller 131.

Figure 10H:
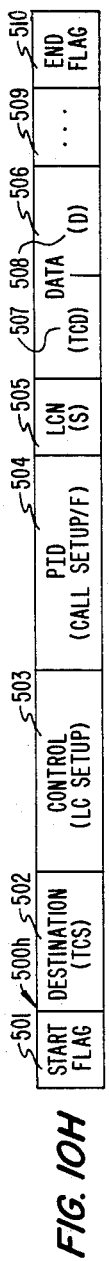

If the comparison at block 623 indicates no errors, the central processor 115 assembles the logical channel setup packet 500h shown in FIG. 10H. This packet is intended for transmission to the originating trunk controller 130 and hence its destination field 502 contains the switch address of the trunk controller 130. The control field 503 identifies the packet as an LC setup packet, and the PID field 504 indicates call setup and forced selection. The LCN field 505 contains the logical address that the trunk controller 130 sent to the central processor 115 in the call setup packet 500c, and the data field 506 contains in the subfield 507 the switch address of the destination trunk controller 131 and contains in the subfield 508 the logical address of the trunk controller 131 that is associated with the call.

Returning to FIG. 9, the central processor 115 transmits the packet 500h to the trunk controller 130 at block 626. Responding in the manner described above for the trunk controller 131, the trunk controller 130 stores the contents of the data field 506 in its logical translation table entry pointed to by the contents of the LCN field 505. This address information is subsequently used by the trunk controller 130 to perform the necessary logical-to-switch address translation for routing packets that are associated with the call that is being set up from trunk controller 130 to trunk controller 131 through the switching network 116.

Figure 10I:
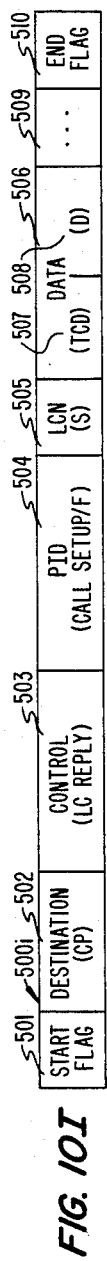

The trunk controller 130 then returns to the central processor 115 the LCACK packet 500i shown in FIG. 10I. The packet 500i is a duplicate of the packet 500h, with the exception that the destination field 502 contains the switch address of the central processor 115.

Returning to FIG. 9, following transmission of the LC setup packet 500h to the trunk controller 130 at block 626, the central processor 115 undertakes other activities while it awaits receipt of a reply from the trunk controller 130 at block 627. If the central processor 115 does not receive a timely response, it treats the condition as an error and handles it in a conventional manner at block 628, for example by retransmitting the packet 500h to the trunk controller 130.

If the central processor 115 does receive the packet 500i at block 627 as a timely response from the trunk controller 130, it disassembles the packet, at block 629, and compares its contents with the contents of the LC setup packet 500h to verify at block 630 that the trunk controller 130 received the correct information. If the comparison indicates a discrepancy at block 631, the central processor 115 handles the error at block 632 in a conventional manner.

Figure 10J:
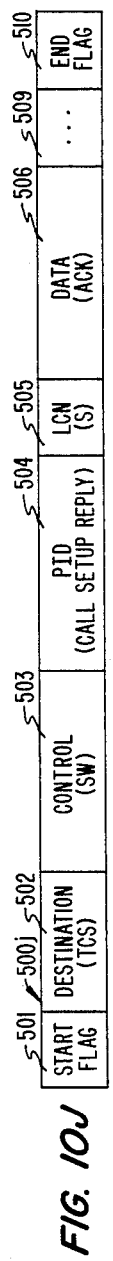

If the comparison at block 631 indicates no errors, the central processor 115 assembles at block 633 an intra-switch call setup acknowledgment packet 500j shown in FIG. 10J. The packet 500j is intended for transmission to the trunk controller 130 and hence its destination field 502 contains the switch address of the trunk controller 130. The control and PID fields 503 and 504 identify the packet 500j as a call setup reply packet. The LCN field 505 contains the logical channel number of the trunk controller 130 that is associated with the call, and the data field 506 contains a call setup acknowledgment message.

Returning to FIG. 9, following assembly of the packet 500j at block 633, the central processor 115 transmits the packet 500j to the trunk controller 130 at block 634.

Figure 10K:
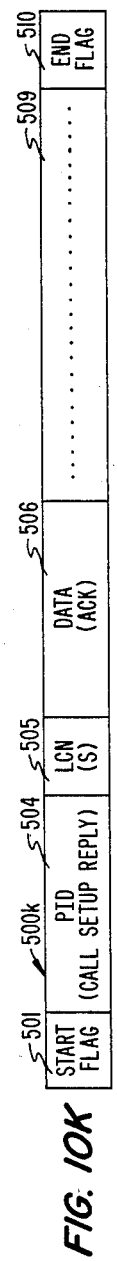

The trunk controller 130 responds to the receipt of the packet 500j in a conventional manner. It forms an inter-switch call setup reply packet 500k shown in FIG. 10K by removing the destination field 502 and the control field 503 from the packet 500j, and transmits the packet 500k over the trunk 117 and through the concentrator 112 to the microprocessor 111.

Figure 10L:
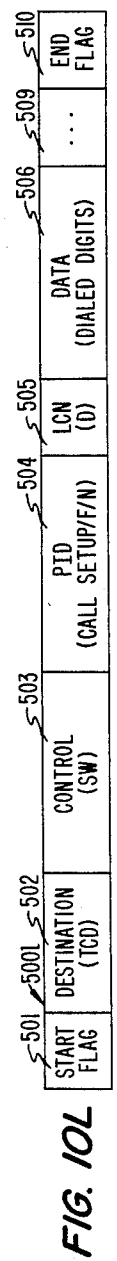

Returning to FIG. 9, following transmission of the packet 500k to the trunk controller 130, at block 634, the central processor 115 assembles at block 635 an intra-switch call setup packet 500l shown in FIG. 10L. This packet 500l is analogous to the packet 500d that was initially received by the central processor 115. The packet 500l is intended for transmission to the trunk controller 131 and hence the destination field 502 contains the switch address of the trunk controller 131. The control field 503 identifies the packet 500l as a switch packet. The PID field 504 identifies the packet 500l as a call setup packet and also indicates forced or normal selection, depending on what determination was made by the central processor 115 at the block 611. The LCN field 505 contains the logical address of the trunk controller 131 that is associated with the call, and the data field 506 contains the dialed digits that were received by the central processor 115 in the packet 500d.

Returning to FIG. 9, following assembly of the packet 500l at block 635, the central processor 115 transmits the packet 500l to the trunk controller 131 at block 636.

Figure 10M:
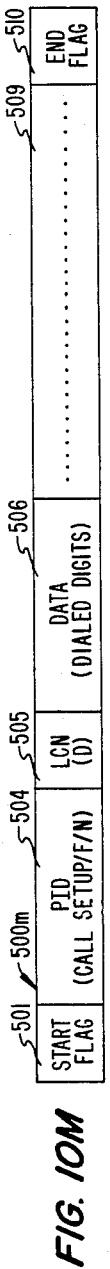

The trunk controller 131 also responds to the receipt of the packet 500l in a conventional manner. It forms an inter-switch call setup packet 500m shown in FIG. 10M by removing the destination field 502 and control field 503 from the packet 500l, and transmits the packet 500m over the trunk 118 to the succeeding office 104.

The operations undertaken at the switch 104 in response to receipt of the packet 500m are directly analogous to those discussed for the switch 102 in response to the packet 500c. In particular, the central processor 113 undertakes activities analogous to those of the central processor 115, as previously described in conjunction with FIG. 9.

Figure 10N:
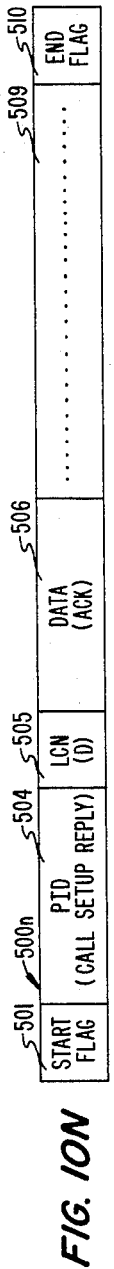

If the processor 113 finds a trunk available and willing to serve the call, it sets up the call path through the switch 104 and causes a call setup acknowledgment packet 500n shown in FIG. 10N to be returned to the switch 102. This packet 500n is like the packet 500k that was sent by the switch 102 to the microprocessor 111, with the exception that the LCN field 505 contains the logical address of the trunk controller 131 that is associated with the call.

However, if the processor 113 does not find a trunk and available and willing to serve the call and leading to a selectable office, it need not necessarily abort the call at block 649, unlike the switch 102. Because the switch 104 is a toll office and not a local office like the switch 102, there is a possibility that the local office 102 may find an alternative toll office to serve the call if the switch 104 informs the switch 102 of its inability to serve the call. However, the switch 104 must indicate to the switch 102 its inability to serve the call before it has committed itself to serving the call by returning a call setup ACK packet 500n to the switch 102. Hence, if the processor 113 does not find a trunk that leads to a selectable office and that is available and willing to serve the call, it checks at block 648 whether it has caused a call path setup ACK packet 500n to be sent to the switch 102. If it has returned an acknowledgment, then the processor 113 aborts the call at block 649 in a conventional manner. But if it has not returned an acknowledgment, then the central processor 113 assembles at block 650 an intra-switch call setup no-acknowledgment (NACK) packet and sends it to the trunk controller 140 at block 651 for transmission to the switch 102. A call setup no-acknowledgment packet is in effect a refusal by a node of the switching system of a request to serve a particular call.

Figure 10O:
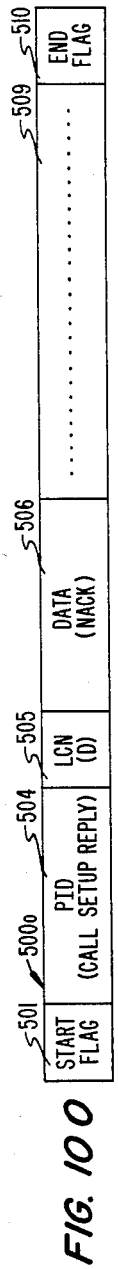

The trunk controller 140 responds to receipt from the central processor 113 of the call setup NACK packet by removing the destination and control fields of that packet to form an inter-switch call setup NACK packet 500o shown in FIG. 10O. The packet 500o is like the packet 500n but its data field 506 carries a message indicating refusal by the switch 104 to handle the call. The trunk controller 140 transmits the packet 500o on the trunk 118 to the switch 102.

Figure 10P:
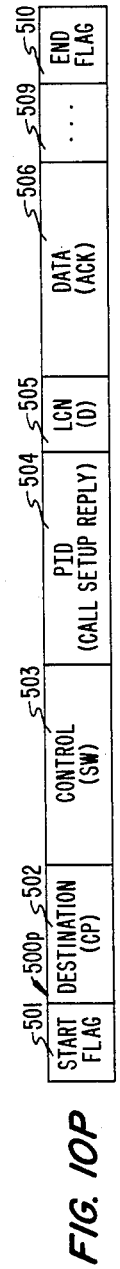
Figure 10Q:
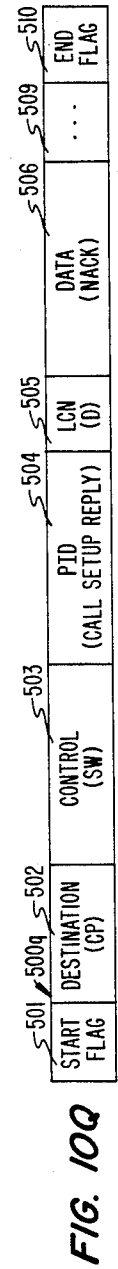
Figure 10R:
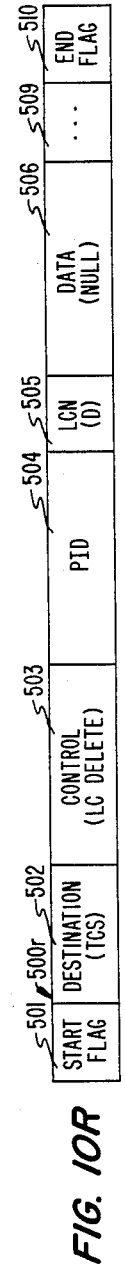

Since the switch 104 has refused to serve the call, it does not need information about the call. Hence the central processor 113 must clear, erase, information about the call that it has stored in various parts of the switch 104. Therefore, following transmission of the call setup NACK packet at block 651, the central processor 113 assembles at block 652 an LC delete packet 500r shown in FIG. 10R. The packet 500r is intended for transmission to the trunk controller 140, which in this example is the originating trunk controller for the switch 104. Hence the packet 500r contains in its destination field 502 the switch address of the trunk controller 140. The control field 503 identifies the packet 500r as an LC delete packet. The LCN field contains the logical address that the switch 104 received in the call setup packet 6m, which is the logical address of the trunk controller 131 that is associated with the call. And the data field 506 is null.

Figure 10S:
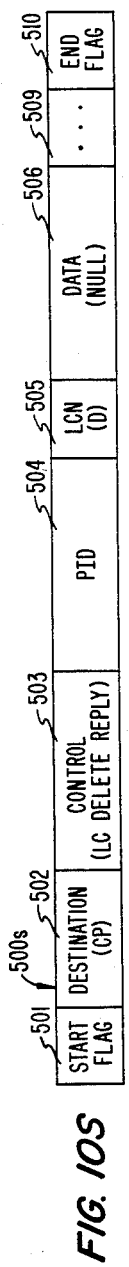

Returning to FIG. 9, the central processor 113 transmits the packet 500r to the trunk controller 140 at block 653. In response to receipt of the packet 500r, the trunk controller 140 accesses the entry in its logical translation table that is pointed to by the contents of the LCN field 505 of the packet 500r and deletes therefrom the information previously stored there. The trunk controller 140 then assembles and sends to the central processor 113 an LC delete ACK packet 500s shown in FIG. 10S. The packet 500s is like the packet 500r except that it contains the switch address of the central processor 113 in the destination field 502 and the control field 503 identifies it as an LC delete reply packet.

Returning to FIG. 9, following transmission of the packet 500r to the trunk controller 140 at block 653, the central processor 113 undertakes other activities while it awaits receipt of the packet 500s from the trunk controller 140 at block 654. If the central processor 113 does not receive the packet 500s in a timely manner at block 654, it treats the condition as an error and handles it in a conventional manner at the block 655.

Following handling of the error at block 655, or if the central processor 113 timely receives the packet 500s at block 654, the central processor 113 reenters the call processing tables in its memory, accesses there the entry associated with the trunk 118, and deletes therefrom the information about the call whose path it had been trying to set up, at block 656. The central processor 113 also clears the portion of the scratchpad memory that was associated with that call and frees it up for use by another call, at block 657. Having thus de-selected the trunk 118, for serving the call, the central processor 113 then ends its call setup activities with respect to the call, at block 658.

Attention is now returned to the activities of the switch 102 following transmission thereto of a call setup reply packet by the switch 104. At the switch 102 the trunk controller 131 receives either the call setup ACK packet 500n or the call setup NACK packet 500o from the switch 104. Responding thereto in the manner discussed above, the trunk controller 131 forms from the received packet either an intra-switch call setup ACK packet 500p shown in FIG. 10P or an intra-switch call setup NACK packet 500q shown in FIG. 10Q, by appending to the received packet a destination field 502 containing the switch address of the central processor 115 and a control field 503 identifying the packet as a call setup response packet.

Returning to a consideration of FIG. 9, following transmission of the call setup packet 500m to the switch 104 at block 636, the central processor 115 of the switch 102 undertakes other activities while it awaits receipt of a call setup response packet from the switch 104 at block 637. If the central processor 115 does not receive a call setup response packet in a timely manner, it treats the condition as an error and handles it in a conventional manner at block 638.

However, if the central processor 115 timely receives either the packet 500p or 500q at the block 637, it disassembles the received packet 500p or 500q at block 639 to determine at block 640 if the response of the switch is an ACK or a NACK. If the response is an ACK, the call path has been successfully set up through switch 104 and the central processor 115 ends its call setup activities at block 641.

Figure 10T:
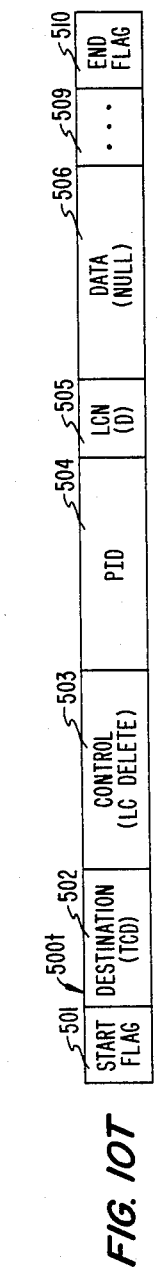

If, however, the response is a NACK, the switch 104 has refused to serve the call, and hence the central processor 115 must de-select the trunk controller 131 and take down the portion of the call path that it has formed through the switch 102 to the switch 104 and, if possible, must find a new path for the call. Hence the central processor 115 assembles at block 642 an LC delete packet 500t shown in FIG. 10T. The packet 500t is intended for transmission to the trunk controller 131, and hence its destination field 502 contains the switch address of the trunk controller 131. The control field 503 identifies the packet 500t as an LC delete packet. The LCN field 505 contains the logical address of the trunk controller 131 that is associated with the call. And the data field 506 is null.

Figure 10U:
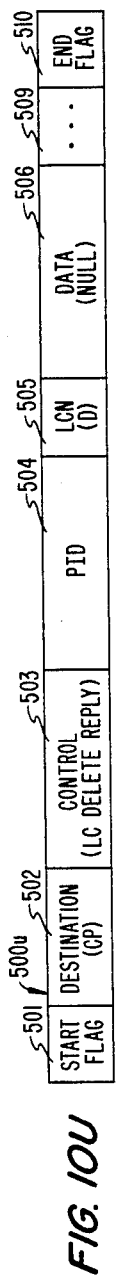

Returning to FIG. 9, the central processor 115 transmits the packet 500t to the trunk controller 131 at block 643. In response to receipt of the packet 500t, the trunk controller 131 accesses the entry in its logical translation table 1505 that is pointed to by the contents of the LCN field 505 of the packet 500t and deletes therefrom the information previously stored there. The trunk controller 131 then assembles and sends to the central processor 115 an LC delete ACK packet 500u shown in FIG. 10U. The packet 500u is like the packet 500t except that it contains the switch address of the central processor 115 in the destination field 502 and the control field 503 identifies it as an LC delete reply packet.

Returning to FIG. 9, following transmission of the packet 500t to the trunk controller 131 at block 643, the central processor 115 undertakes other activities while it awaits receipt of the packet 500u from the trunk controller 131 at block 644. If the central processor 115 does not receive the packet 500u in a timely manner at block 644, it treats the condition as an error and handles it in a conventional manner at the block 645.

Following handling of the error at block 645, or if the central processor 115 timely receives the packet 500s at block 644, the central processor 115 reenters the call processing tables in its memory, accesses there the entry associated with the trunk 118, and deletes therefrom the information about the call whose path it is setting up, at block 646. Having thus completed de-selection of the trunk 118, the central processor 115 returns to block 604 to attempt to find a new route for the call. If it cannot find a new route, it aborts the call at block 649.

Returning to a consideration of the call handling activities of the switch 104 and assuming that the processor 113 selected and set up a call path to the office 107, the processor 113 then transmits a call setup packet to central processor 123 of the office 107 via switching network 146, trunk controller 142, trunk 119, trunk controller 147, and switching network 148. Processor 123 performs similar operations to those performed by processor 113 and transmits a new call setup packet to central processor 114 via switching network 148, trunk controller 149, trunk 120, trunk controller 150, and switching network 151.

Upon receipt of the call setup packet from processor 123, central processor 114 also performs the activities described in conjunction with FIG. 9. Assuming that path selection is henceforth successful, the central processor 114 stores the logical address information of this packet and the switch address designating trunk controller 150 in trunk controller 141. Central processor 114 then transmits a new logical address and the switch address designating trunk controller 141 to trunk controller 150, which stores this information. After storing the necessary information in trunk controllers 141 and 150, processor 114 assembles a new call setup packet having the logical address which had previously been stored in trunk controller 150 in the logical address field and transmits this call setup packet to microprocessor 125 via switching network 151, trunk controller 141, trunk 124, and concentrator 126.

Upon receipt of the call setup packet from processor 114, microprocessor 125 reads the logical address information contained in the logical address field and stores the logical address in address memory 152 of access line controller 126a. Microprocessor 125 then transmits a call reply packet to microprocessor 111 via the previously defined route through the packet switching systems of FIGS. 1A and 1B. The logical address field of the packet contains the logical address which microprocessor 125 received in the call setup packet from processor 114.

Trunk controller 141 is responsive to the receipt of the packet to translate the contents of the logical address field using the previously stored logical address to switch address translation information and to insert the previously stored logical address into the call reply packet. The switch address which results from this translation by trunk controller 141 designates trunk controller 150. This switch address is used by switching network 151 to route the call reply packet to trunk controller 150. Trunk controller 150 is responsive to receipt of the call reply packet to transmit this packet to trunk controller 149 via trunk 120. The call reply packet is similarly routed through the various trunk controllers until it is received by microprocessor 111. Once the call reply packet is received by microprocessor 111, all the necessary information for routing calls through the various switching networks is stored within the trunk controllers and access line controllers in the route.

Of course, various changes and modifications to the illustrative embodiment described above will be apparent to those skilled in the art. For example, when a selected trunk controller refuses to serve a call, the central processor may force it to serve the call, by sending it a new LC set up packet indicating forced selection. Similarly, when all controllers of trunks leading to a selected office have refused to serve a call, the central processor may force one of them to serve the call. Or when the attempts counter has reached its limit, the central processor may select either an alternative trunk or one of the previously-selected trunks and force its controller to serve the call. Furthermore, the inter-trunk communication links need not be telephony trunks but may be other media such as communication buses or radio links. Also, the packet switching system need not be a telephony system but may be for example a computer communication network. Such changes and modifications can be made without departing from the spirit and the scope of the invention and without diminishing its attendant advantages. It is therefore intended that such changes and modifications be covered by the following claims.

What is claimed is:

1. A method of communication traffic load control in a packet switch that includes a plurality of controllers each for interfacing an associated communication link to the switch, comprising the steps of:
    selecting a controller to serve a communication;
    notifying the selected controller of the selection;
    determining the communication traffic load of the selected controller; and
    the selected controller refusing to serve the communication, in response to both receipt of notice of selection and a determination that the communication traffic load of the selected controller exceeds a predetermined level.

2. The method of claim 1 further comprising the step of:
    the selected controller accepting to serve the communication, in response to both receipt of the notice of selection and a determination that the load of the selected controller subceeds the predetermined level.

3. The method of claim 1 further comprising the step of:

selecting another controller to serve the communication, in response to the refusal.

4. The method of claim 1 wherein the step of notifying comprises the step of notifying the selected controller of the selection via one of a first and a second signal; wherein the step of refusing comprises the step of the selected controller refusing to serve the communication, in response to both receipt of the second signal and a determination that the load exceeds the predetermined level; and the method further comprising the steps of accepting by the selected controller accepting to serve the communication, in response to receipt of the first signal, and the selected controller accepting to serve the communication, in response to both receipt of the second signal and a determination that the load subceeds the predetermined level.

5. The method of claim 1 further comprising the steps of:

de-selecting the selected controller, in response to the refusal; and selecting another controller to serve the communication, in response to the refusal.

6. The method of claim 1 further comprising the steps of:

de-selecting the selected controller, in response to the refusal by the selected controller; and the switch refusing to serve the communication, in response to the refusal by the selected controller.

7. The method of claim 1 further comprising the step of:

forcing a controller to serve the communication, in response to the refusal.

8. The method of claim 1 further comprising the steps of:

the selected controller accepting to serve the communication in response to determination that the load of the selected controller subceeds the predetermined level;

sending a request to serve the communication to the selected controller for transmission on the associated link, in response to the acceptance;

receiving over the associated link through the selected controller a refusal of the request to serve the communication, in response to the transmitted request to serve the communication;

de-selecting the selected controller, in response to receipt of the refusal of the request; and selecting another controller to serve the communication, in response to receipt of the refusal of the request.

9. A method of communication traffic load control in a packet switch that includes a plurality of controllers each for interfacing an associated communication link to the switch and a processor for controlling the switch, comprising the steps of:

the processor selecting a controller to serve a communication in response to receipt of a request to serve the communication;

notifying the selected controller of the selection;

determining at the selected controller the communication traffic load of the selected controller; and the selected controller notifying the processor of refusal by the selected controller to serve the communication, in response to both receipt of the notice of selection and a determination that the load of the selected controller exceeds a predetermined level.

10. The method of claim 9 wherein the step of notifying the selected controller comprises the step of notifying the selected controller of the selection via one of a first and a second signal;

wherein the step of notifying the processor of refusal comprises the step of the selected controller notifying the processor of refusal by the selected controller to serve the communication, in response to both receipt of the second signal and a determination that the load of the selected controller exceeds the predetermined level; and the method further comprising the steps of the selected controller notifying the processor of acceptance by the selected controller to serve the communication, in response to both receipt of the second signal and a determination that the load of the selected controller subceeds the predetermined level, and the selected controller notifying the processor of acceptance by the selected controller to serve the communication, in response to receipt of the first signal.

11. The method of claim 9 furhter comprising the steps of:

the processor de-selecting the selected controller, in response to receipt of the notice of refusal; and the processor selecting antoher controller to serve the communication, in response to the receipt of the notice of refusal.

12. The method of claim 9 furhter comprising the steps of:

the processor de-selecting the selected controller, in response to receipt of the notice of refusal; and the processor refusing to serve the communication by the switch, in response to the receipt of the notice of the selected controller's refusal, 13. The method of claim 9 further comprising the step of:

the processor forcing a controller to serve the communication, in response to receipt of the notice of refusal.

14. The method of claim 13 wherein the step of forcing a controller comprises the step of:

notifying the controller that it is forced to serve the communication.

15. The method of claim 9 further comprising the steps of:

the selected controller notifying the processor of acceptance by the selected controller to serve the communication, in response to both receipt of the notice of selection and determination that the load of the selected controller subceeds the predetermined level;

sending a request to serve the communication from the processor to the selected controller, in response to receipt of the notice of acceptance;

transmitting the request to serve the communication from the selected controller on the associated link, in response to receipt of the request by the selected controller;

receiving a refusal of the request to serve the communication at the selected controller over the associated llnk, in response to the transmitted request to handle the communication;

sending the received refusal of the request from the selected controller to the processor;

the processor de-selecting the selected controller, in response to receipt by the processor of the refusal of the request; and the processor selecting another controller to serve the communication, in response to the receipt by the processor of the refusal of the request.

16. A method of call traffic load control in a packet switch that includes a processor for controlling the switch, and a plurality of trunk controllers each for interfacing an associated trunk to the switch and each capable of defining a plurality of channels simultaneously, each channel for a different call, comprising the steps of:

the processor selecting a trunk controller to serve the call, in response to receipt by the processor of a call setup packet;

sending a channel setup request packet from the processor to the selected trunk controller;

determining at the selected trunk controller the call traffic load of the selected trunk controller; and sending a channel setup refusal packet from the selected trunk controller to the processor, in response both to receipt by the selected trunk controller of the channel setup request packet and determination that the load of the selected trunk controller exceeds a predetermined level.

17. The method of claim 16 further comprising the step of:

sending a channel setup acceptance packet from the selected trunk controller to the processor, in response both to receipt by the selected trunk controller of the channel setup request packet and determination that the load of the selected trunk controller subceeds the predetermined level.

18. The method of claim 16 further comprising the steps of:

the processor de-selecting the selected trunk controller, in response to receipt by the processor of the channel setup refusal packet; and the processor selecting another trunk controller to serve the call, in response to the receipt by the processor of the channel setup refusal packet.

19. The method of claim 16 further comprising the steps of:

sending a channel setup command packet from the processor to a trunk controller, in response to receipt by the processor of the channel setup refusal packet; and sending a channel setup acceptance packet from the trunk controller to the processor, in response to receipt by the trunk controller of the channel setup command packet.

20. The method of claim 16 wherein the step of selecting a trunk controller to serve the call is preceded by the step of sending a call setup packet, received by a first trunk controller over the associated trunk, from the first trunk controller to the processor; and wherein the step of sending a channel setup refusal packet from the selected trunk controller is followed by the steps of the processor de-selecting the selected trunk controller, in response to receipt by the processor of the channel setup refusal packet, and sending a call setup refusal packet from the processor to the first controller for transmission over the associated trunk, in response to receipt by the processor of the channel setup refusal packet.

21. The method of claim 17 wherein the step of selecting a trunk controller to serve the call is preceded by the step of sending a first call setup packet, received by a first trunk controller over the associated trunk, from the first trunk controller to the processor; and wherein the step of sending a channel setup acceptance packet is followed by the steps of sending a channel setup command packet from the processor to the first trunk controller, in response to receipt by the processor of the channel setup acceptance packet, sending a channel setup acceptance packet from the first trunk controller to the processor, in response to receipt by the first trunk controller of the channel setup command packet, sending a second call setup acknowledgment packet from the processor to the first trunk controller for transmission over the associated trunk, in response to receipt by the processor of a channel setup acceptance packet, and sending a call setup packet from the processor to the selected trunk controller for transmission over the associated trunk, in response to receipt by the processor of a channel setup acceptance packet.

22. The method of claim 21 further comprising the step of:

the processor awaiting receipt from the selected trunk controller of one of a call setup refusal and a call setup acknowledgment packet received by the selected trunk controller over the associated trunk.

23. The method of claim 21 further comprising the steps of:

sending a call setup refusal packet, received by the selected trunk controller over the associated trunk in response to the second call setup packet, from the selected trunk controller to the processor;

the processor de-selecting the selected trunk controller, in response to receipt by the processor of the second call setup refusal packet;

sending a first channel delete packet from the processor to the de-selected trunk controller;

sending a first channel delete acknowledgment packet from the de-selected trunk controller to the processor, in response to receipt of the first channel delete packet;

sending a second channel delete packet from the processor to the first trunk controller;

sending a second channel delete acknowledgment packet from the first trunk controller to the processor, in response to receipt of the second channel delete packet; and the processor selecting another trunk controller to serve the call, in response to receipt by the processor of the call setup refusal packet.

24. A packet switch comprising:

a plurality of controllers, each controller for interfacing an associated communication link to the switch;

means for selecting a controller to serve a communication;

means responsive to selection of a controller by the selecting means for notifying the selected controller of the selection;

means for determining the communication traffic load of the selected controller; and means associated with the selected controller for refusing to serve the communication by the selected controller, in response to both receipt of notice from the notifying means of selection of the controller and determination by the determining means that the communication traffic load of the selected controller exceeds a predetermined level.

25. The switch of claim 24 wherein the determining means comprise:
means associated with the selected trunk controller for determining the communication traffic load of the associated controller.

26. The switch of claim 24 wherein the determining means comprise:
means for determining the communication traffic load of the controller, in response to receipt of the notice from the notifying means of selection of the controller.

27. The switch of claim 24 further comprising:
means for accepting to serve the communication by the selected controller, in response to both receipt of the notice from the notifying means of selection of the controller and determination by the determining means that the load of the selected controller subceeds the predetermined level.

28. The switch of claim 24 further comprising:
means for selecting another controller to serve the communication, in response to refusal by the refusing means.

29. The switch of claim 24 wherein the notifying means comprise
means responsive to selection of a controller by the selecting means for notifying the selected controller of the selection via one of a first and a second signal; and
wherein the refusing means comprise
means for refusing to serve the communication, in response to both receipt of the second signal and determination by the determining means that the communication traffic load of the selected controller exceeds the predetermined level,
means for accepting to serve the communication, in response to receipt of the first signal, and in response to both receipt of the second signal and determination by the determining means that the communication traffic load of the second controller subceeds the predetermined level.

30. The switch of claim 24 further comprising:
means for de-selecting the selected controller, in response to refusal by the refusing means; and
means cooperative with the de-selecting means for selecting another controller to serve the communication, in response to the refusal.

31. The switch of claim 24 further comprising:
means for de-selecting the selected controller, in response to refusal by the refusing means; and
means cooperative with the de-selecting means for refusing to serve the communication by the switch, in response to the refusal.

32. The switch of claim 24 further comprising:
means for forcing a controller to serve the communication, in response to refusal by the refusing means.

33. The switch of claim 24 further comprising:
means for selecting the controller to serve a communication, in response to receipt of a request to serve the communication;
means for accepting to serve the communication by the selected controller, in response to determination by the determining means that the load of the selected controller subceeds the predetermined level;
means for sending a request to serve the communication to the selected controller for transmission on the associated link, in response to acceptance by the accepting means;
means for de-selecting the selected controller, in response to receipt over the associated link through the selected controller of a refusal, responsive to the request, of the request; and
means cooperative with the de-selecting means for selecting another controller to serve the communication, in response to receipt of the refusal of the request.

34. In a packet switch that includes a plurality of controllers each for interfacing an associated communication link to the switch and a processor for controlling the switch, the improvement comprising:
means associated with the processor for selecting one of the controllers to serve a communication, in response to receipt of a request to serve the communication;
means responsive to selection of a controller by the selecting means for notifying the selected controller of the selection;
means associated with the selected controller for determining the communication traffic load thereof; and
means associated with the selected controller for notifying the processor of the selected controller's refusal to handle the communication, in response both to receipt of selection notice from the selection-notifying means and determination by the determining means that the load of the selected controller exceeds a predetermined level.

35. The switch of claim 34 wherein
the selection-notifying means comprise
means for notifying the selected controller of the selection via one of a first and a second signal;
wherein the refusal-notifying means comprise
means for notifying the processor of the selected controller's refusal to serve the communication, in response to both receipt of the second signal and determination by the determining means that the load of the selected controller exceeds the predetermined level; and
means for notifying the processor of the selected controller's acceptance to serve the communication, in response to receipt of the first signal, and in response to both receipt of the second signal and determination by the determining means that the load of the selected controller subceeds the predetermined level.

36. The switch of claim 34 further comprising
means associated with the processor for de-selecting the selected controller, in response to receipt of notice of refusal by the refusal-notifying means; and
wherein the selecting means comprise
means for selecting another controller to serve the communication, in response to receipt of the notice of refusal.

37. The switch of claim 34 further comprising:
means associated with the processor for de-selecting the selected controller, in response to receipt of notice of refusal by the refusal-notifying means; and means associated with the processor for refusing to serve the communication by the switch, in response to receipt of the notice of refusal.

38. The improvement of claim 34 further comprising:
means associated with the processor for forcing a controller to receipt of serve the call, in response to notice of refusal by the refusal-notifying means.

39. The improvement of claim 38 wherein the forcing means comprise:
means for notifying the controller that it is forced to serve the call.

40. The improvement of claim 34 further comprising:
means for notifying the processor of acceptance by the selected controller to serve the communication, in response to both receipt of selection notice from the selection-notifying means and determination by the determining means that the load of the selected controller subceeds the predetermined level;
means associated with the processor for sending to the selected controller a request to serve the communication, in response to receipt of notice of acceptance from the acceptance-notifying means;
means associated with the selected controller for transmitting the request to serve the communication on the associated link, in response to receipt of the request from the request-sending means;
means associated with the selected controller for sending to the processor a refusal, responsive to the transmitted request and received at the selected controller over the associated link, of the transmitted request,
means associated with the processor for de-selecting the selected controller, in response to receipt by the processor of refusal of the transmitted request; and
the selecting means including means for selecting another controller to serve the communication, in response to receipt by the processor of the refusal of the transmitted request.

41. In a packet switch that includes a processor for controlling the switch, and a plurality of trunk controllers, each controller for interfacing an associated trunk to the switch and each controller capable of defining a plurality of channels simultaneously, each channel for a different call, the improvement comprising:
means included in the processor for selecting one of the trunk controllers to serve a call, in response to receipt by the processor of a call setup packet;
means associated with the processor for sending a channel setup request packet from the processor to a selected trunk controller in response to selection of the trunk controller by the selecting means;
means included in the selected trunk controller for determining the call traffic load of the selected trunk controller; and
means associated with the selected trunk controller for sendin9 a channel setup refusal packet to the processor, in response to both receipt by the selected trunk controller of the channel setup request packet and determination by the determinin9 means that the load of the selected trunk controller exceeds a predetermined level.

42. The switch of claim 41 wherein the channel setup refusal packet sendin9 means further comprise:
means for sending a first channel setup acceptance packet to the processor, in response to both receipt by the selected trunk controller of the channel setup request packet and determination by the determining means that the load of the selected trunk controller subceeds the predetermined level.

43. The switch of claim 41 further comprising
means included in the processor for de-selecting the selected trunk controller, in response to receipt by the processor of the channel setup refusal packet; and
wherein the selecting means comprise
means for selecting another trunk controller to serve the call, in response to the receipt by the processor of the channel setup refusal packet.

44. The switch of claim 41 wherein the channel setup request packet sending means further comprise
means for sending a channel setup command packet from the processor to a trunk controller, in response to receipt by the processor of the channel setup refusal packet; and
wherein the channel setup refusal packet sending means comprise
means for sending a channel setup acceptance packet to the processor, in response to receipt by the trunk controller of the channel setup command packet.

45. The switch of claim 41 further comprising:
means associated with a first trunk controller for sending to the processor a call setup packet received by the first trunk controller over the associated trunk;
means included in the processor for de-selecting the selected trunk controller, in response to receipt by the processor of the channel setup refusal packet; and
means associated with the processor for sending a call setup refusal packet to the first controller for transmission over the associated trunk, in response to the receipt by the processor of the channel setup refusal packet.

46. The switch of claim 42 further comprising:
means associated with a first trunk controller for sending a call setup packet, received by the first trunk controller over the associated trunk, to the processor, and further for sending a second channel setup acceptance packet to the processor, in response to receipt by the first trunk controller of a channel setup command packet;
means associated with the processor for sending a channel setup command packet to the first trunk controller, in response to receipt by the processor of the first channel setup acceptance packet, and further for sending a second call setup acknowledgment packet to the first trunk controller for transmission over the associated trunk, in response to receipt by the processor of a channel setup acceptance packet; and
wherein the sending means associated with the processor for sending a channel setup request packet to the selected controller further comprise
means for sending a call setup packet to the selected trunk controller for transmission over the associated trunk, in response to receipt by the processor of a channel setup acceptance packet.

47. The switch of claim 46 wherein the de-selecting means further comprise
means for de-selecting the selected trunk controller, in response to receipt by the processor of a call setup refusal packet received by the selected trunk controller over the associated trunk in response to the second call setup packet;

wherein the means associated with the processor for sending to the selected trunk controller further comprise means for sending a first channel delete packet to the de-selected trunk controller;

wherein the sending means associated with the de-selected trunk controller further comprise means for sending a first channel delete acknowledgment packet to the processor, in response to receipt of the first channel delete packet;

wherein the means associated with the processor for sending to the first trunk controller further comprise means for sending a second channel delete packet to the first trunk controller;

wherein the sending means associated with the first trunk controller further comprise means for sending a second channel delete acknowledgment packet to the processor, in response to receipt of the second channel delete packet; and wherein the selecting means further comprise means for selecting another trunk controller to serve the call, in response to receipt by the processor of the call setup refusal packet.

* * * * *

UNITED STATES PATENT AND TRADEMARK OFFICE
CERTIFICATE OF CORRECTION

PATENT NO. : 4,611,322

DATED : September 9, 1986

INVENTOR(S) : Mikiel L. Larson and Wing N. Toy

It is certified that error appears in the above-identified patent and that said Letters Patent is hereby corrected as shown below:

Column 23, line 13, before "the selected", delete "accepting by";

Column 29, line 57, "sendin9" should be --sending--;
Column 29, line 60, "determinin9" should be --determining--;
Column 29, line 64, "sendin9" should be --sending--.

Signed and Sealed this

Fourth Day of August, 1992

Attest:

DOUGLAS B. COMER

Attesting Officer     Acting Commissioner of Patents and Trademarks